(12) United States Patent
Yamazaki

(10) Patent No.: US 7,379,139 B2
(45) Date of Patent: May 27, 2008

(54) LIQUID CRYSTAL DISPLAY AND ELECTRO-OPTICAL DEVICES WITH A FUNCTION ELEMENT

(75) Inventor: Yasushi Yamazaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 11 days.

(21) Appl. No.: 10/329,827

(22) Filed: Dec. 27, 2002

(65) Prior Publication Data

US 2003/0179324 A1    Sep. 25, 2003

(30) Foreign Application Priority Data

Mar. 19, 2002    (JP)    ............... 2002-077150
Sep. 25, 2002    (JP)    ............... 2002-279102

(51) Int. Cl.
*G02F 1/133*    (2006.01)

(52) U.S. Cl. ............. 349/116; 345/104; 349/151

(58) Field of Classification Search ............ 349/42, 349/43, 151, 110, 111; 257/59, 72; 345/87–92, 345/101

See application file for complete search history.

(56) References Cited

U.S. PATENT DOCUMENTS

| | | | |
|---|---|---|---|
| 5,585,817 A * | 12/1996 | Itoh et al. ................ | 345/104 |
| 5,850,271 A * | 12/1998 | Kim et al. ................ | 349/111 |
| 6,236,063 B1 * | 5/2001 | Yamazaki et al. .......... | 257/59 |
| 6,243,069 B1 * | 6/2001 | Ogawa et al. ............. | 345/102 |
| 6,255,705 B1 * | 7/2001 | Zhang et al. ............. | 257/412 |
| 6,320,568 B1 | 11/2001 | Zavracky | |
| 6,323,846 B1 | 11/2001 | Westerman et al. | |
| 6,384,818 B1 | 5/2002 | Yamazaki et al. | |
| 6,414,740 B1 * | 7/2002 | Hosoyamada ............... | 349/161 |
| 6,765,562 B2 | 7/2004 | Yamazaki et al. | |
| 6,809,718 B2 * | 10/2004 | Wei et al. ................ | 345/102 |
| 6,850,303 B2 | 2/2005 | Kimura et al. | |
| 6,906,342 B1 * | 6/2005 | Chang et al. ............. | 257/59 |
| 7,268,777 B2 | 9/2007 | Yamazaki et al. | |
| 2002/0030768 A1 * | 3/2002 | Wu ....................... | 349/42 |
| 2002/0089496 A1 * | 7/2002 | Numao .................... | 345/204 |
| 2002/0154252 A1 * | 10/2002 | Toyota et al. ............ | 349/38 |
| 2003/0010922 A1 * | 1/2003 | Yoon et al. .............. | 250/370.09 |
| 2003/0076295 A1 * | 4/2003 | Nakajima ................. | 345/156 |
| 2004/0217357 A1 * | 11/2004 | Zhang et al. ............. | 257/72 |
| 2005/0088433 A1 | 4/2005 | Yamazaki et al. | |
| 2005/0093852 A1 | 5/2005 | Yamazaki et al. | |

FOREIGN PATENT DOCUMENTS

CN    1164971 C    4/2002

(Continued)

*Primary Examiner*—David Nelms
*Assistant Examiner*—Lucy Chien
(74) *Attorney, Agent, or Firm*—Oliff & Berridge, PLC

(57) ABSTRACT

The invention provides a liquid crystal display device which makes it possible to increase functionality by mounting a function element without having to externally mount the function element onto an area near and outside of a liquid crystal display panel. A liquid crystal display device includes a plurality of pixels disposed in a matrix form and a drive element to drive the pixels. A function element, having a function that is different from the function of the drive element, is disposed in an area including the plurality of pixels and used to display. By this, it is possible to increase functionality because function elements having various functions can be incorporated inside a panel.

2 Claims, 16 Drawing Sheets

FOREIGN PATENT DOCUMENTS

| | | | |
|---|---|---|---|
| JP | A 5-80314 | | 4/1993 |
| JP | A-10-104663 | | 4/1998 |
| JP | 10-170959 | * | 6/1998 |
| JP | 10/246879 | | 9/1998 |
| JP | A 10-333605 | | 12/1998 |
| JP | A-11-075101 | | 3/1999 |
| JP | 11-187211 | * | 7/1999 |
| JP | A 2000-047259 | | 2/2000 |
| JP | 2001-183648 | * | 7/2001 |
| KR | 1996-029853 | | 8/1996 |
| KR | 1997-0022424 | | 5/1997 |

* cited by examiner

LIQUID CRYSTAL DISPLAY AND ELECTRO-OPTICAL DEVICES WITH A FUNCTION ELEMENT

BACKGROUND OF THE INVENTION

1. Field of Invention

The present invention relates to a liquid crystal display device, an electro-optical device and a method of producing the same, and an electronic apparatus.

2. Description of Related Art

A related art liquid crystal display device includes a liquid crystal display panel (display section) including an element substrate having pixel electrodes and switching elements, such as TFTs (thin-film transistors), to control the pixel electrodes disposed in a matrix form between a plurality of data lines and scanning lines that cross each other, an opposing substrate having an electrode opposing the pixel electrodes, and liquid crystals disposed between both of these substrates. The switching elements are electrically connected to the data lines to supply image signals and the scanning lines to successively apply scanning signals. A data line drive circuit and a scanning line drive circuit to open and close the switching elements and to control the liquid crystal display are provided at areas situated outside of and near the liquid crystal display panel.

In the related liquid crystal display device, in addition to the scanning line drive circuit and the data line drive circuit, various function elements, such as various sensors and various circuits (IC), are exclusively externally mounted on areas situated outside of and near the liquid crystal display panel.

This related art device is disclosed in Japanese Unexamined Patent Application Publication No. 5-80314 (page 6, FIG. 1).

SUMMARY OF THE INVENTION

However, when an attempt is made to externally mount various members onto portions outside of the liquid crystal display panel, the surrounding mounting area of the substrate not contributing to a displaying operation becomes large, so that there is a limit as to how much the functionality of the liquid crystal display device within a particular limited area of the substrate is increased, thereby making it difficult to achieve integration in the liquid crystal display device due to external mounting.

Only function elements of the type which can be mounted on the area outside of and near the liquid crystal panel can be mounted. Accordingly, when, for example, the function elements are members which are disposed in a matrix form so that the same functions are uniformly two-dimensionally provided, or are wide-area-type function members which occupy a wide area, they cannot be mounted, so that there is a limit in the types of functions that can be provided.

When a function element is externally mounted to the liquid crystal display panel, the liquid crystal display panel and the function element are different members, so that the process for producing the liquid crystal display panel and the process for producing the function element need to be performed, thereby increasing the number of processes, the process time, and costs.

The present invention is provided in view of the above-described circumstances, and provides a liquid crystal display device which is capable of achieving higher integration and functionality, and which can be reduced in cost without making it necessary to externally mount a function element to an area situated outside of and near a liquid crystal display panel by making it possible to mount function elements including types which cannot be mounted to the area situated outside of and near the liquid crystal display panel. The invention also provides an electro-optical device, a method of producing the same, and an electronic apparatus.

A first liquid crystal display device of the present invention includes a plurality of pixels disposed in a matrix form and a drive element to drive the pixels. A function element having a function that is different from the function of the drive element is disposed in an area (hereinafter an image display area) including the plurality of pixels and used for display.

According to the first liquid crystal display device of the present invention, since the function element can be incorporated inside the area including the plurality of pixels making up the liquid crystal display device and used for display, it is possible to incorporate various functions inside the area used for display, to increase functionality, and to achieve higher integration.

A second liquid crystal display device of the present invention has an area used for display and includes a plurality of pixels disposed in a matrix form, a drive element to drive the pixels, and a signal wiring layer to drive the pixels. A function element having a function that is different from the function of the drive element is disposed at a location where the function element overlaps the drive element or the wiring layer within the area used for display.

According to the above-described second liquid crystal display device of the present invention, the location overlapping the wiring layer or the drive element is situated where display quality is not affected when a displaying operation is performed in either a transmission mode or a reflection mode, so that, by forming the function element at this location within the area used for display, the display quality is not reduced even if functionality is increased by incorporation of the function element.

A third liquid crystal display device of the present invention includes a plurality of pixels disposed in a matrix form at a predetermined interval and a drive element to drive the pixels. A plurality of function elements each having a function that is different from the function of the drive element are provided in the same plane as the plurality of pixels disposed in a matrix form. The distance between the plurality of function elements is different from the distance between the pixels disposed in a matrix form.

According to the third liquid crystal display device of the present invention, by forming the plurality of pixels and the plurality of function elements in the same plane, and by making the distance between each of the plurality of function elements and the distance between each of the plurality of pixels different, it is possible to incorporate the plurality of function elements while minimizing the extent to which the plurality of function elements interfere with transmission of light, to form the pixels and to produce the function elements in the same production process, and not to reduce display quality even while increasing functionality.

In the liquid crystal display device having the above-described structure, it is desirable for the distance between the function elements to be larger.

According to this structure, the number of function elements disposed in an image display area is reduced, so that the area occupied by the function elements in a plane is reduced, thereby making it possible to widen the area passing light and contributing to display, so that a reduction in the aperture ratio is minimized, and a reduction in display quality is prevented or substantially prevented from occurring.

The function element may be disposed at a pair of substrates sandwiching liquid crystals, one substrate having the drive element and the wiring layer formed thereon and the other substrate opposing the one substrate. In this case, the other substrate may have a light-shielding layer formed thereon at a location thereof opposing the drive element, and the function element may be interposed between the light-shielding layer and the other substrate. Alternatively, the function element may be formed at the side of the light-shielding layer facing the liquid crystals. Alternatively, the function element may be formed on the surface of the other substrate opposite to the side of the surface thereof facing the liquid crystals. Alternatively, the function element may be disposed on one of a pair of substrates sandwiching liquid crystals, the one substrate having the drive element and the wiring layer formed thereon.

A fourth liquid crystal display device of the present invention includes a plurality of pixels disposed in a matrix form at a predetermined interval and a drive element to drive the pixels. A plurality of function elements each having a function that is different from the function of the drive element are provided in the same plane as the plurality of pixels disposed in a matrix form. The distance between a plurality of function elements each having a first function is different from the distance between the pixels disposed in a matrix form. At locations not overlapping the plurality of function elements having a first function, the distance between a plurality of function elements each having a function that is different from the first function is different from the distance between the pixels disposed in a matrix form.

According to the fourth liquid crystal display device of the present invention, by making it possible to mount at least two types of function elements having different functions and, at the same time, making the distance between these function elements and the distance between the pixels different, it is possible to incorporate the function elements while reducing or minimizing the extent to which the plurality of function elements interfere with transmission of light.

To this end, a fifth liquid crystal display device of the present invention includes a plurality of pixels disposed in a matrix form and a drive element to drive the pixels. A plurality of function elements each having a function that is different from the function of the drive element are provided in the same plane as the plurality of pixels disposed in a matrix form. The area of the pixels and the area of the function elements are different. In this case, it is possible to, for example, make the area of the pixels larger.

According to the fifth liquid crystal display device of the present invention, since the area of the function elements can be set independently of the area occupied by the pixels in accordance with the function and performance of the function elements, the function elements are designed with greater freedom. When the area of the pixels is made larger, it is possible to restrict a reduction in display quality caused by the provision of the function elements.

In the second liquid crystal display device of the present invention, a structure may be used where the wiring layer includes a plurality of data lines and a plurality of scanning lines that cross each other. Liquid crystal driving pixel electrodes are formed in respective areas surrounded by the data lines and the scanning lines. The function element has a pair of electrodes, with the pair of electrodes being provided on a pair of substrates sandwiching liquid crystals, respectively, so that they cross each other in a plane. This structure is an example of a combination of an active matrix liquid crystal display device and a passive matrix function element.

Alternatively, a liquid crystal display device may be provided including a plurality of pixels disposed in a matrix form, a plurality of liquid crystal driving scanning electrodes, and a plurality of data electrodes that cross the plurality of scanning electrodes in a plane. A function element having a function-element electrode electrically connected to a plurality of data lines and a plurality of scanning lines that cross each other is disposed in an area used for a displaying operation. This structure is an example of a combination of a passive matrix liquid crystal display device and an active matrix function element. Alternatively, a structure may be used in which a function element having a function-element electrode is disposed in an area used for a displaying operation, and a liquid crystal driving electrode is used as the function-element electrode.

The function element or function elements may include a plurality of types of function members.

A first electro-optical device of the present invention includes a plurality of pixels disposed in a matrix form and a drive element for driving the pixels. A function element having a function that is different from the function of the drive element is disposed in an area including the plurality of pixels and used for a displaying operation.

Although, in the foregoing description, the present invention is described as being directed to a liquid crystal display device, devices including such a type of function element are not limited to liquid crystal display devices, so that the present invention is applicable to electro-optical devices including pixel driving elements. Even in this case, the same advantages as those of the above-described liquid crystal display devices can be provided.

A second electro-optical device of the present invention has an area used for a displaying operation and including a plurality of pixels disposed in a matrix form, a drive element to drive the pixels, and a signal wiring layer to drive the pixels. A function element having a function that is different from the function of the drive element is disposed at a location where the function element overlaps the drive element or the wiring layer within the area used for display.

A third electro-optical device of the present invention includes a plurality of pixels disposed in a matrix form at a predetermined interval and a drive element to drive the pixels. A plurality of function elements each having a function that is different from the function of the drive element are provided in the same plane as the plurality of pixels disposed in a matrix form. The distance between the plurality of function elements is different from the distance between the pixels disposed in a matrix form.

A fourth electro-optical device of the present invention includes a plurality of pixels disposed in a matrix form at a predetermined interval and a drive element to drive the pixels. A plurality of function elements each having a function that is different from the function of the drive element are provided in the same plane as the plurality of pixels disposed in a matrix form. The distance between a plurality of function elements having a first function is different from the distance between the pixels disposed in a matrix form. At locations not overlapping the plurality of function elements having a first function, the distance between a plurality of function elements each having a function that is different from the first function is different from the distance between the pixels disposed in a matrix form.

A fifth electro-optical device of the present invention includes a plurality of pixels disposed in a matrix form and a drive element to drive the pixels. A plurality of function elements each having a function that is different from the function of the drive element are provided in the same plane as the plurality of pixels disposed in a matrix form. The area of the pixels and the area of the function elements are different.

In a first method of producing an electro-optical device of the present invention including a plurality of pixels disposed in a matrix form and a drive element to drive the pixels, a function element having a function that is different from the function of the drive element is formed in an area including the plurality of pixels and used for display.

In a second method of producing an electro-optical device of the present invention having an area used for display and including a plurality of pixels disposed in a matrix form, a drive element to drive the pixels, and a signal wiring layer to drive the pixels, a function element having a function that is different from the function of the drive element is formed at a location where the function element overlaps the drive element or the wiring layer within the area used for a displaying operation.

In a third method of producing an electro-optical device of the present invention including a plurality of pixels disposed in a matrix form at a predetermined interval and a drive element to drive the pixels, a plurality of function elements each having a function that is different from the function of the drive element are formed in the same plane as the plurality of pixels disposed in a matrix form, and the distance between the plurality of function elements is different from the distance between the pixels disposed in a matrix form.

In a fourth method of producing an electro-optical device of the present invention including a plurality of pixels disposed in a matrix form at a predetermined interval and a drive element to drive the pixels, a plurality of function elements each having a function that is different from the function of the drive element are formed in the same plane as the plurality of pixels disposed in a matrix form, the distance between a plurality of function elements each having a first function is different from the distance between the pixels disposed in a matrix form, and at locations not overlapping the plurality of function elements having a first function, the distance between a plurality of function elements each having a function that is different from the first function is different from the distance between the pixels disposed in a matrix form.

In a fifth method of producing an electro-optical device of the present invention including a plurality of pixels disposed in a matrix form and a drive element to drive the pixels, a plurality of function elements each having a function that is different from the function of the drive element are provided in the same plane as the plurality of pixels disposed in a matrix form, and the area of the pixels and the area of the function elements are different.

An electronic apparatus includes any one of the above-described electro-optical devices. According to the present invention, it is possible to realize an electronic apparatus having excellent display quality, and having various types of functions, such as a touch-key function or a display correction function based on temperature.

DETAILED DESCRIPTION OF PREFERRED EMBODIMENTS

Hereunder, a description of preferred embodiments of the present invention is provided in detail with reference to the drawings.

First Embodiment (Overall Structure of Liquid Crystal Display Device)

First, hereunder, a description of the general structure of the entire liquid crystal display device of a first embodiment of the present invention is provided with reference to FIG.

Figure 1:
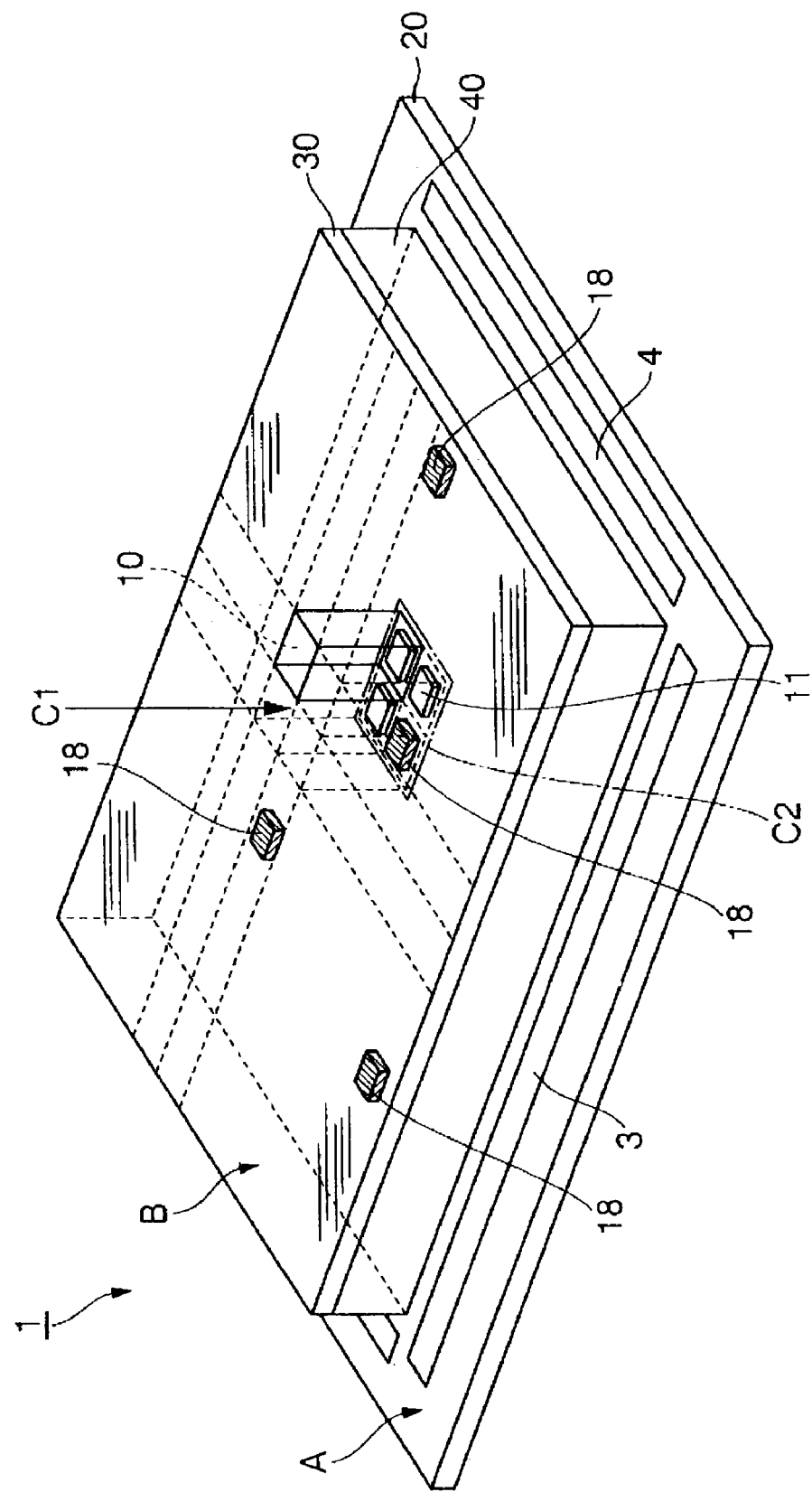
FIG. 1 is a schematic perspective view showing an example of the general structure of the entire liquid crystal display device of a first embodiment of the present invention.

1. FIG. 1 is a schematic perspective view of an example of the general structure of the entire liquid crystal display device.

As shown in FIG. 1, a liquid crystal display device 1 of the embodiment is, for example, an active matrix liquid crystal display panel and includes an element substrate 20 having switching elements (drive elements) (not shown in FIG. 1 but described in detail below) and pixel electrodes 11 formed in a matrix form on one surface thereof, an opposing substrate 30 opposing the element substrate 20, and a liquid crystal layer 40 including liquid crystals filled between the element substrate 20 and the opposing substrate 30. A sealant (not shown) is formed on the element substrate 20 along the four edges of the opposing substrate 30, so that the liquid crystals can fill the area between the element substrate 20 and the opposing substrate 30 by the sealant along the four sides of the opposing substrate 30.

In the liquid crystal display device 1 shown in FIG. 1, an area A situated outside of and near the opposing substrate 30 and an image-displayable image display area B which is an area including a plurality of pixels 10, which is used for display, and which has substantially the same contour are formed within the opposing substrate 30. In the area A situated outside of and near the opposing substrate 30, a data line drive circuit 3 and a scanning line drive circuit 4 to open and close a switching element and to control display are provided on the element substrate 20. The data line drive circuit 3 is provided along one side of the element substrate 20, and the scanning line drive circuit 4 is provided along another side of the element substrate 20 adjacent to the one side along which the data line drive circuit 3 is provided.

Here, of the plurality of pixels 10, which form the image display area B and which are formed in a matrix form, one pixel 10 includes all of the structural elements to operate one pixel and is like a space which includes a pixel electrode, a switching element to select the pixel electrode, a hold capacitor, a scanning line and a data line (neither of which is not shown in FIG. 1, but is described below in detail) to apply an electrical potential to the pixel electrode, the liquid crystal layer 40, etc. One pixel refers to a rectangular area partitioned by scanning lines and data lines in a plane. However, for a liquid crystal display device including color filters having pixel layers of different colors R (red), G (green), and B (blue) described below, what is referred to as a pixel above becomes one dot, so that three dots, an R dot, a G dot, and a B dot, form one pixel.

In the embodiment, any number of function elements 18 having functions which differ from those of the switching elements is provided within any space in the image display area B. In other words, for example, members that in the related art are disposed in the outside area A are disposed within spaces in the image display area B. Hereunder, the location of a function element in the planar structure of the liquid crystal display device and the location of the function element in the sectional structure of the liquid crystal display device are described in more detail below.

(Planar Structure of Liquid Crystal Display Device)

Figure 2:
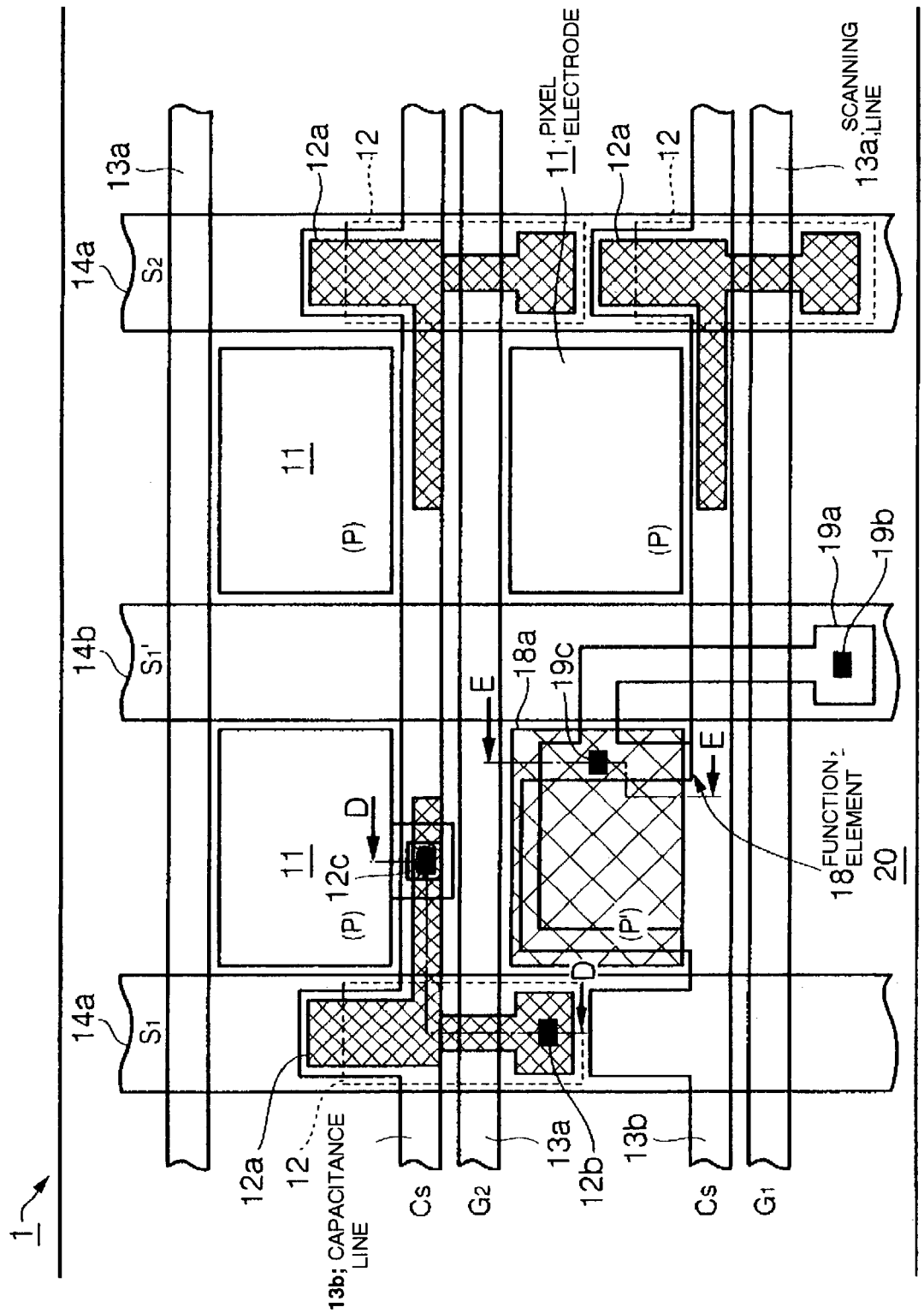
FIG. 2 is a plan view of areas of a portion of the liquid crystal display device shown in FIG. 1.

First, the planar structure of the liquid crystal display device 1 is described with reference to FIG. 2. FIG. 2 is a plan view (of area C2 in FIG. 1) in which the element substrate along with the various structural elements formed thereon are seen from the opposing substrate (from the C1 direction in FIG. 1), in a portion of the image display area including a plurality of pixels disposed in a matrix form in the liquid crystal display device of the embodiment. FIG. 2 shows pixel electrodes, wiring layers, various elements, etc., in a plurality of pixel groups, adjacent each other, on the element substrate.

As shown in FIG. 2, the pixel electrodes 11, the switching elements 12 (referred to as "drive elements"), a plurality of scanning lines 13a, a plurality of data lines 14a, capacitance lines 13b, and the function element 18 are included within and formed on the element substrate 20 of the liquid crystal display device 1. The pixel electrodes 11 are disposed in a matrix form. The switching elements 12, which can perform a switching driving operation, are disposed in a matrix form in correspondence with the pixel electrodes 11 and are used to supply a predetermined electrical potential to the pixel electrodes 11. The scanning lines 13a are wiring layers to select the plurality of switching elements 12 disposed in a matrix form. The data lines 14a are wiring layers to supply current to the pixel electrodes 11 through the switching elements 12 which have been turned on by scanning signals from the scanning lines 13a. The capacitance lines 13b are wiring layers to provide storage capacitance to prevent leakage of a predetermined voltage held by the liquid crystal layer 40. The function element 18 is disposed in place of a pixel electrode 11 in an area where the pixel electrode 11 should be disposed and has a function which differs from those of the switching elements 12.

Like the pixel electrodes 11, the function element 18 is disposed in an area surrounded by the scanning lines 13a, the capacitance lines 13b, and the data lines 14a and 14b. In other words, in place of a pixel electrode 11, the function element 18 is disposed in an area where the pixel electrode 11 is conventionally formed. The function element 18 may be disposed in place of any of the plurality of pixel electrodes 11.

In the embodiment, on the one hand, the scanning lines 13a, which are used to select the switching elements 12, are formed as wirings to operate function element 18, so that they are also used as function element scanning lines to select the function element 18. On the other hand, the data line 14b for the function element is provided separately from the data lines 14a to select the switching elements 12. The scanning lines 13a are each connected to the scanning line drive circuit 4 shown in FIG. 1, and the data lines 14a and 14b are each connected to the data line drive circuit 3 shown in FIG. 1.

The pixel electrodes 11 are formed of transparent electrically conductive thin films, such as ITO (indium tin oxide) films, and are electrically connected to semiconductor layers 12a, which are transistor channel areas forming the switching elements 12, through contact holes 12c.

In the embodiment, it is assumed that the pixel electrodes 11 are disposed so that the pixel electrodes 11 and the wiring layers, such as the scanning lines 13a, the data lines 14a, the data line 14b, and the capacitance lines 13b, do not overlap in plan view. Therefore, the contours of areas P, which contribute to a displaying operation, and the pixel electrodes 11 are substantially the same. It does not matter whether the wiring layers and the pixel electrodes are formed with the same or different layers.

The switching elements 12 are formed of, for example, TFTs (thin film transistors), and are provided on portions of the respective semiconductor layers 12a that are transistor channel areas. They are electrically connected to the respective scanning lines 13a through gate films, and are electrically connected to the respective data lines 14a through contact holes 12b.

The semiconductor layers 12a forming the switching elements 12 are electrically connected to the pixel electrodes 11 through the contact holes 12c in order to make it possible to cause the switching elements 12 and their respective pixel electrodes 12 to be in electrical conduction with each other.

The scanning lines 13a are wiring layers to sequentially, such as line-sequentially, apply scanning signals G1, G2, . . . , in pulses at a predetermined timing, and are electrically connected to the respective switching elements 12 and the function element 18.

The data lines 14a are wiring layers to, for example, line-sequentially supply image signals S1, S2, . . . , and are electrically connected to the respective switching elements 12. Accordingly, by opening the switching elements 12 for a certain period of time by the scanning signals G1, G2, . . . , the image signals S1, S2, . . . , supplied from the data lines 14 are to be written at a predetermined timing.

The data lines 14b supply or read out the signals S1, . . . , and are electrically connected to the function element 18. Accordingly, by opening the switch of the function element 18 by the scanning signals G1, G2, . . . , for a certain period of time, information of the function element 18 is read out or written by the data lines 14. In the embodiment, the data lines 14a for the pixel electrodes and the data line 14b for the function element are provided, so that the signals S1, S1, S2, . . . are supplied and read out.

Here, when a function element 18 is provided instead of a pixel electrode 11, a "function element scanning line" and a "function element data line" may be wired so that they three-dimensionally overlap the scanning lines 13a and the data lines 14a of the pixel electrodes 11. However, in order to shorten the wiring time, it is desirable that the data line 14b of the function element 18 alone be provided separately from the data lines 14a of the pixel electrodes 11, and the scanning line 13a of the function element be the same type as the scanning lines 13a for the pixel electrodes 11 to select the switching elements 12.

The capacitance lines 13b are wires to provide capacitance between them and the semiconductor layers 12a. They provide storage capacitance to prevent leakage of predetermined-level image signals S1, S2, . . . , which have been written on the liquid crystal layer 40 through the pixel electrodes 11 and which have been retained for a certain period of time.

Any type of element may be used for the function element 18 as long as it is a semiconductor circuit, a member, or an element of a type which functions differently from the switching elements 12. Examples are various types of image pick-up elements, various types of memory elements, various types of operating circuits, temperature correction circuits which can correct the temperature of each pixel, pixel feedback circuits, photodiodes, and sensors (disposed two-dimensionally) of, for example, touch panels to detect changes in electrical potential which is retained by an electrode for display.

Although the area occupied by the function element 18 in a plane depends upon the type of function element, when, for example, a member occupying a large area is used, the film thickness of the member may be made large, so that the area occupied by the member in a plane is minimized.

The function element 18 used in the embodiment is, for example, a sensor, which includes a sensor electrode 18a and a semiconductor layer 19a that is a channel area of a sensor switching element to select the sensor electrode 18a. The capacitance line 13b is formed so as to extend within the area where the sensor electrode 18a is formed.

The sensor electrode 18a is electrically connected to the semiconductor layer 19a forming the sensor switching element through a contact hole 19c. The semiconductor layer 19a forming the sensor switching element is electrically connected to the data line 14b through a contact hole 19b. By this, the data line 14b and the sensor electrode 18a can be brought into electrical conduction through the semiconductor layer 19a forming the sensor switching element.

In the liquid crystal display device 1 having the above-described structure, the scanning line drive circuit 4 applies the scanning signals G1, G2, . . . , to the switching elements 12 through the scanning lines 13a and causes the switching elements 12 to be in electrical conduction, and applies the voltage image signals S1, S2, . . . , to the pixel electrodes 11 through the data lines 14a in accordance with gradation, so that an electrical field in accordance with the image signal voltage is applied to the liquid crystal layer 40 in order to perform a displaying operation.

On the other hand, the function element 18 is operated by the scanning lines 13a and the data line 14b by a driving controlling operation of the scanning line drive circuit 4 and the data line drive circuit 3. For example, when the function element 18 is a sensor, it is in a state in which it can perform a detecting operation.

In this way, in the planar structure of the liquid crystal display device, as shown in FIG. 2, the wiring layers, such as the data lines 14, the scanning lines 13a, and the capacitance lines 13b, are formed in the form of a lattice. By positioning the pixel electrodes 11 and the function element 18 in gaps of the lattice formed by these wiring layers, it is possible to dispose the function element 18 within the image display area.

Figure 11:
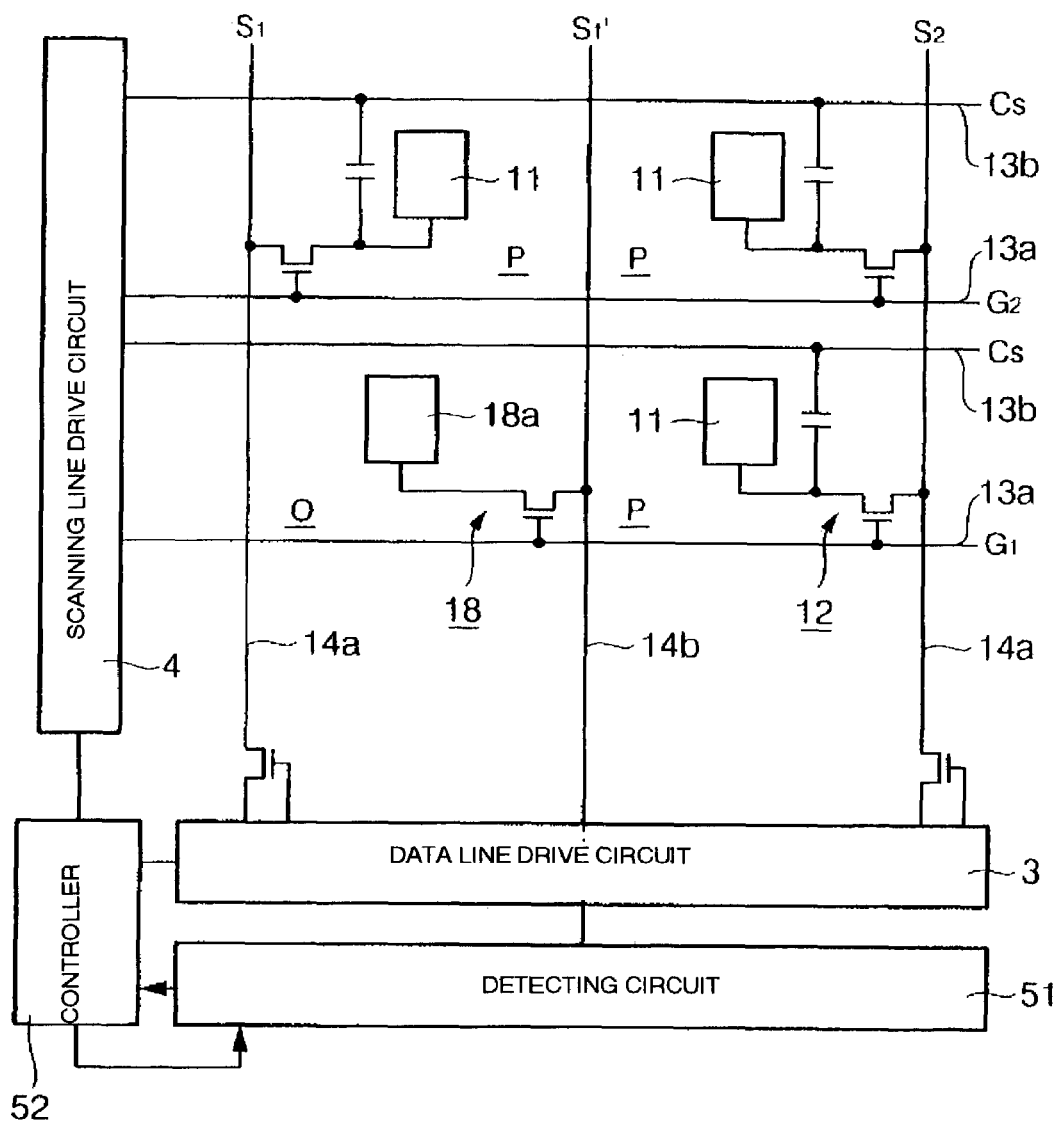
FIG. 11 is a schematic of an equivalent circuit of the liquid crystal display device of the first embodiment of the present invention.

FIG. 11 illustrates an equivalent circuit in the liquid crystal display device of the embodiment. The switching elements 12 and the pixel electrodes 11 are provided in three of the four areas, that is, three areas P which contribute to a displaying operation, and the function element 18 including the sensor electrode 18a is provided in an area O which does not contribute to a displaying operation. Whereas the scanning lines 13a are connected to the scanning line drive circuit 4, the data lines 14a are connected to the data line drive circuit 3. The data line 14b electrically connected to the function element 18 is connected to a detecting circuit 51, so that changes in, for example, electrical charge produced at the function element 18 is read out through the data line 14b. A controller 52 connected to the scanning line drive circuit 4, the data line drive circuit 3, and the detecting circuit 51 is provided. By operation of the controller 52, not only does the function element 18 read out data, but it also writes data.

(Sectional Structure of Liquid Crystal Display Device)

Figure 4A:
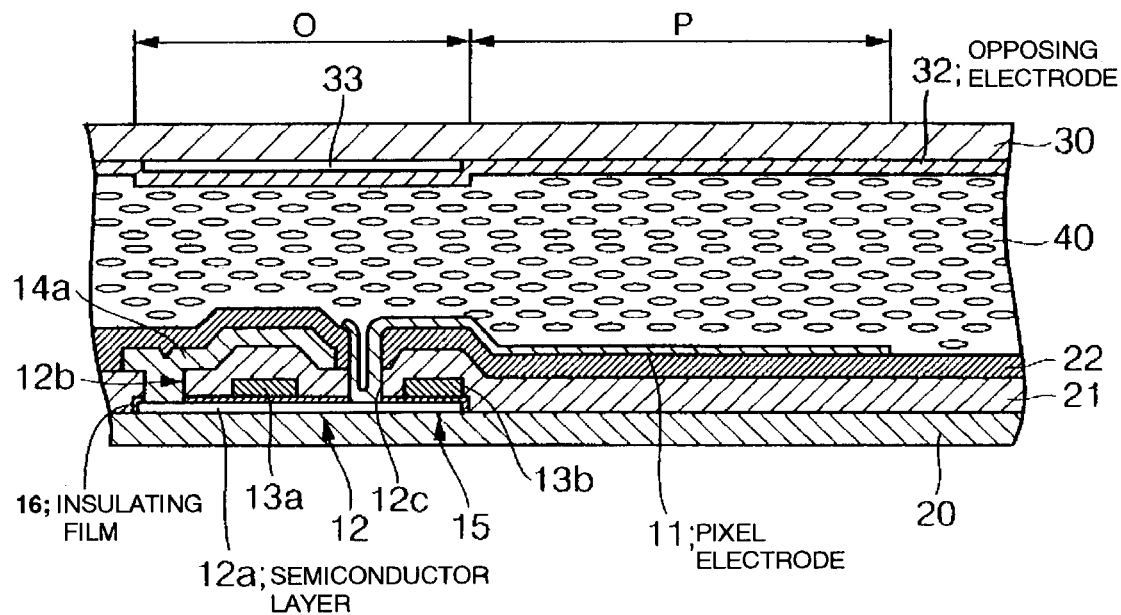
FIG. 4(A) is a sectional view taken along arrows D of the liquid crystal display device shown in FIG. 2.
Figure 4B:
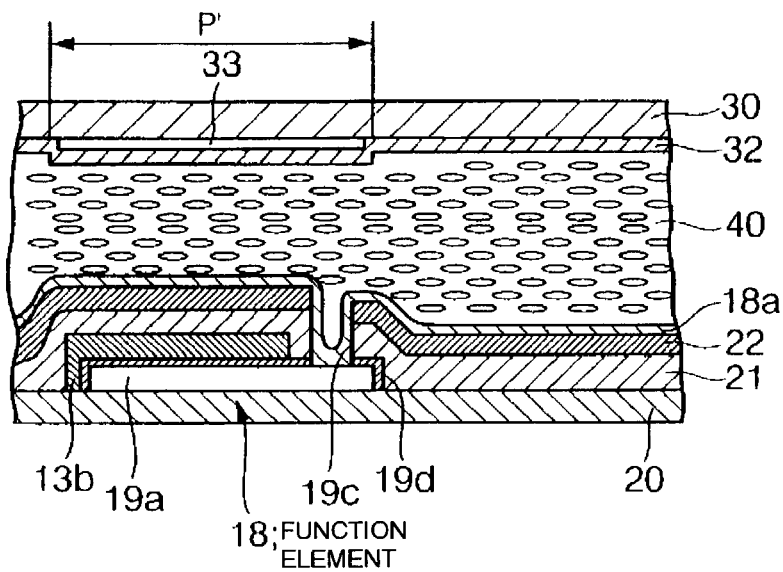
FIG. 4(B) is a sectional view taken along arrows E of the liquid crystal display device shown in FIG. 2.

Next, a description of the sectional structure of the liquid crystal display device is provided using FIGS. 4(A) and 4(B). FIG. 4(A) is a sectional view taken along plane D-D of FIG. 2, and FIG. 4(B) is a sectional view taken along plane E-E of FIG. 2.

As shown in FIG. 4(A), in the sectional structure of the areas where the switching elements 12 of the liquid crystal display device are formed, the element substrate 20, which is a TFT array substrate where the pixel electrodes 11, the switching elements 12, the scanning lines 12a, the data lines 14, etc., are formed, the opposing substrate 30 having an electrode 32 opposing the pixel electrodes 11, and the liquid crystal layer 40 filling the gap between the element substrate 20 and the opposing substrate 30 are included and formed.

At least one of the pair of substrates is a transparent substrate. The element substrate 20 is, for example, a glass substrate, a quartz substrate, or a silicon substrate, and the opposing substrate 30 is a transparent substrate such as a glass substrate or a quartz substrate. The semiconductor layers 12a, an insulating film 16, the scanning lines 13a and the capacitance lines 13b, a first interlayer insulating layer 21, the data lines 14a, a second interlayer insulating layer 22, and the pixel electrodes 11 are formed on the element substrate 20. The semiconductor layers 12a are disposed directly on the element substrate 20. The insulating film 16 includes a gate insulating film for insulating the scanning lines 13a and the semiconductor layers 12a. The scanning lines 13a and the capacitance lines 13b are separated from each other on the insulating film 16. The first interlayer insulating layer 21 is formed so as to cover the scanning lines 13a, the capacitance lines 13b, the insulating film 16, and the element substrate 20. The data lines 14a are disposed on the first interlayer insulating layer 21 in the areas where the semiconductor layers 12a are formed. The second interlayer insulating layer 22 is formed over the area covering the data lines 14a and the first interlayer insulating layer 21. The pixel electrodes 11 are formed on the second interlayer insulating layer 22.

The contact hole 12b passing through the first interlayer insulating layer 21 and the insulating film 16 is formed, so that the data lines 14a and the semiconductor layers 12a can be electrically connected. The contact hole 12c passing through the second interlayer insulating layer 22, the first interlayer insulating layer 21, and the insulating film 16 is formed, so that the pixel electrodes 11 and the semiconductor layers 12a can be electrically connected.

Like the pixel electrodes 11 formed on the element substrate 20, the opposing electrode 32 is formed of a transparent electrically conductive thin film, such as an ITO film. A light-shielding layer 33 and the opposing electrode 32 (common electrode) are formed on the surface of the opposing substrate 30 at the liquid crystal layer 40 side, at an area of the opposing substrate 30 opposing the area of the element substrate 20 where the data lines 14, the scanning lines 13a, and the switching elements 12 are formed, that is, at a non-display area O including each pixel. The opposing electrode 32 (common electrode) is formed over the entire surface so as to cover the light-shielding layer 33.

The light-shielding layer 33 has, for example, a function to increase contrast and a function to prevent mixing of colors of colored materials, that is, functions as a black matrix. The light-shielding layer 33 blocks incident light traveling from the opposing substrate 30 in order to prevent or substantially prevent malfunctioning caused by forcible entry of light into lightly doped drain areas, lightly doped source areas, and the channel areas of the semiconductor layers 12a formed on the element substrate 20.

In the liquid crystal display device 1, alignment layers (not shown) are provided over the entire surfaces of the element substrate 20 and the opposing substrate 30.

The element substrate 20 and the opposing substrate 30 are disposed so that the pixel electrodes 11 and the opposing electrode 32 oppose each other, and the space surrounded by the substrates is filled with liquid crystals in order to form the liquid crystal layer 40.

In FIG. 4(A), a pixel electrode is formed in section. In FIG. 4(B), the function element is formed in section. More specifically, the sectional structure of the portion where the pixel electrodes are formed, and the sectional structure of the portion where the function element is formed are different.

The function element 18 is, for example, a sensor, and is disposed on top of the element substrate 20 as shown in FIG. 4(B). In the area where the function element 18 is disposed, the semiconductor layer 19a, an insulating film 19d, the capacitance line 13b, the first interlayer insulating layer 21, the second interlayer insulating layer 22, and the sensor electrode 18a are formed on the element substrate 20. The semiconductor layer 19a, which is a transistor channel area to form the sensor switching element, is disposed directly on the element substrate 20. The insulating film 19d includes a gate insulating film. The capacitance line 13b is formed so as to extend on the insulating film 19d. The first interlayer insulating film 21 is formed so as to cover the capacitance line 13b, the insulating film 16, and the element substrate 20. The second interlayer insulating layer 22 is formed over the area covering the first interlayer insulating layer 21. The sensor electrode 18a is formed on the second interlayer insulating layer 22.

The contact hole 19c passing through the second interlayer insulating layer 22, the first interlayer insulating layer 21, and the insulating film 19d is formed, so that the sensor electrode 18a and the semiconductor layer 19a can be electrically connected. Accordingly, the use of the semiconductor layer 19a, which is a channel area to form the transistor of the switching element for the function element, makes it possible to select the sensor electrode 18a of the function element 18 to detect information.

Basically, the light-shielding layer 32 is formed in the area O, shown in FIG. 4(A), where the switching elements 12 and the wiring layers are formed, and the light-shielding layer 32 is not formed in the areas P which contribute to a displaying operation by the pixel electrodes 11. However, as shown in FIG. 4(B), the light-shielding layer 32 may be formed in an area P' where the function element 18 is formed as required.

As shown in FIG. 2 and FIG. 4(A), in the liquid crystal display device 1 having the above-described planar and sectional structures, the areas P, which contribute to a displaying operation by the pixel electrodes 11, and the non-display area O, which does not contribute to a displaying operation by the switching elements 12 and by the wiring layers, such as the scanning lines 13a, the data lines 14a, the data lines 14b, and the capacitance lines 13b, are formed. Accordingly, the function element 18 is disposed in place of a pixel electrode 11 which is formed in the related art in an area P contributing to a displaying operation.

Figure 3:
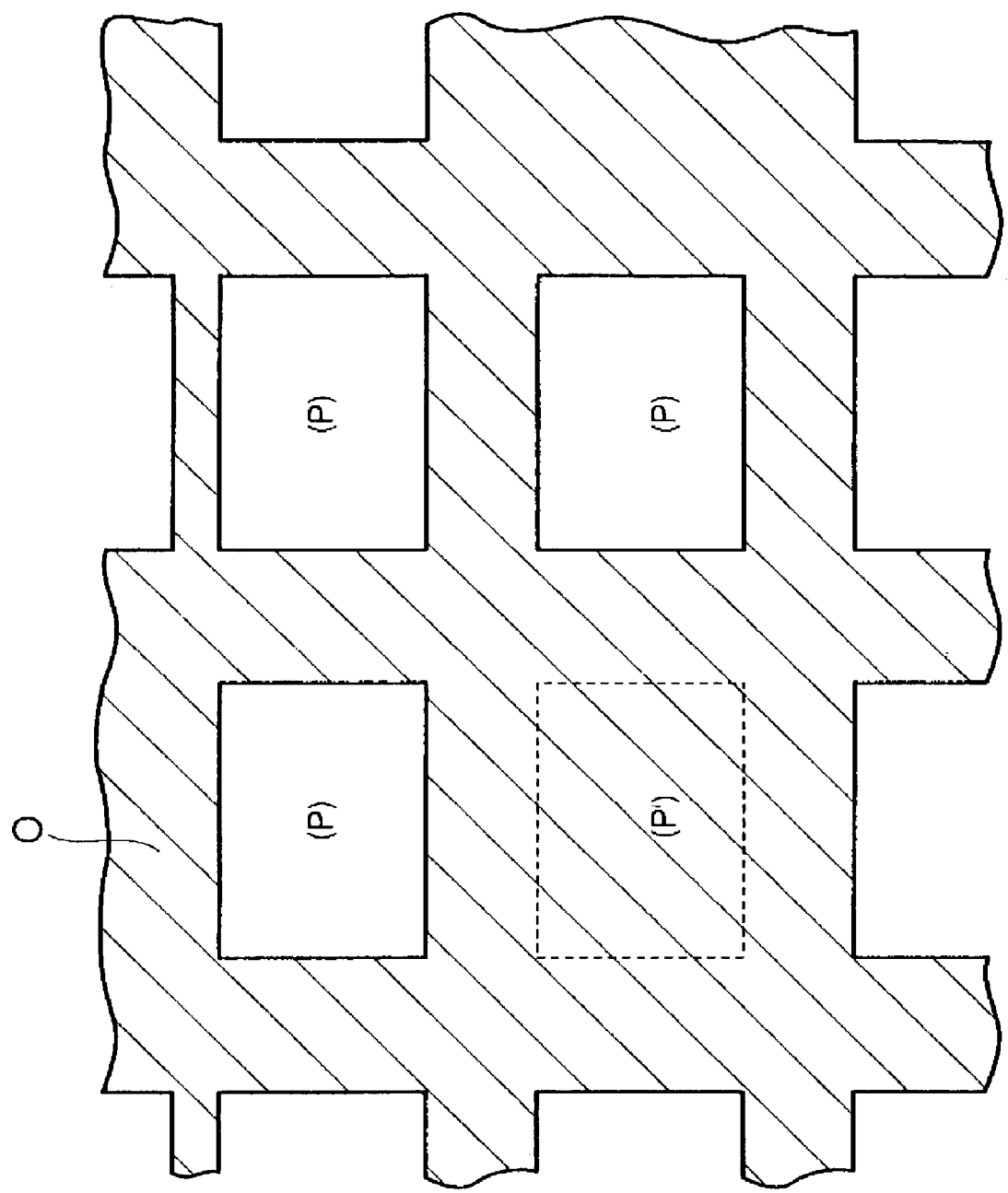
FIG. 3 is a cross-sectional view illustrating areas contributing to a displaying operation and a non-display area not contributing to a displaying operation in a planar structure of the liquid crystal display device shown in FIG. 2.

In other words, in the planar structure, the areas P, which contribute to a displaying operation by the pixel electrodes 11, and the area O, which does not contribute to a displaying operation, are formed as shown in FIG. 3, and the function element 18 is disposed in the area P' included in the area O not contributing to this displaying operation.

Here, for example, incident light from the opposing substrate 32 passes through the areas P, but does not pass through the areas O and P'.

The area P' where the function element 18 is disposed is an area not contributing to a displaying operation. It is assumed that, when the entire image display area is viewed, the effects of the function element 18 on the display can be ignored. In such a case, the function element 18 may be formed with any structure irrespective of the areas P and O or is not limited to one having regularity.

In this way, function elements (having all kinds of functions, such as sensors or circuits having functions other than a displaying function), such as members which are disposed in the related art near and outside of the liquid crystal display panel or members which cannot be disposed there, may be used to add functions other than a displaying function by using a wide area, called the image display area. Therefore, it is possible to effectively use the image display area and display space, to add various new functions in order to make the liquid crystal display device multifunctional, and to make it advantageous from the viewpoint of achieving integration.

(Production Process)

Next, a description of the process of producing the liquid crystal display device having the above-described structure is provided with reference to FIGS. 4(A) and 4(B).

First, the element substrate 20, which is a quartz substrate, a hard glass substrate, a silicon substrate, or the like, is provided. Here, desirably, the element substrate 20 is annealed at a high temperature in an atmosphere of inactive gas, so that it is pre-processed (heat treated) so as to reduce distortion of the substrate in a high-temperature process performed later.

Next, an amorphous silicon film is formed on the element substrate 20 by low-pressure CVD in a relatively low temperature environment. Thereafter, by annealing the amorphous silicon film in an atmosphere of nitrogen, a polysilicon film is caused to grow to a firm layer until it has a particular thickness. By this, the structures of the semiconductor layers 12a of the switching elements 12 and the structure of the semiconductor layer 19a of the function element 18 are formed.

Thereafter, the semiconductor layers 12a forming the switching elements 12 are caused to undergo thermal oxidation at a predetermined temperature in order to form thin thermally grown silicon oxide films. Further, by, for example, the low-pressure CVD method, relatively thin high-temperature silicon oxide films or silicon nitride films are deposited in order to form the insulating film 16 having a multi-layer structure. Here, the semiconductor layers 12a may be formed by a method of forming polysilicon by laser annealing or a method of bonding monocrystal silicon to a substrate. The insulating film 16 may be formed by using a method which allows the insulation film 16 to be formed at a lower temperature, such as the PECVD method.

Thereafter, after depositing a polysilicon film by, for example, the low-pressure CVD method, phosphorous or the like is thermally diffused in order to make the polysilicon film electrically conductive. Thereafter, the polysilicon film is subjected to patterning in order to form the scanning lines 13a and the capacitance lines 13b with a predetermined pattern shown in FIG. 2. Here, instead of the polysilicon film, a metal gate formed by depositing Al, Mo, Ti, Ta, Cr, or W, or an alloy thereof by sputtering, may be used.

Next, when the switching elements 12 are to be formed as n-channel-type TFT elements having an LDD structure, in order to form the lightly doped source areas and the lightly doped drain areas in the semiconductor layers 12a, gate electrodes, which become part of the scanning lines 13a, are used as diffusion masks to provide lightly doping with impurity ions. By this, the semiconductor layers 12a, formed below the scanning lines 13a, become channel areas.

Next, in order to form heavily doped source areas and heavily doped drain areas of the switching elements 12, after forming resist layers on the scanning lines 13a using a mask having a width that is larger than the width of the scanning lines 13a, heavy doping is performed using impurity ions.

When the semiconductor layers 12a forming the switching elements 12 are formed by polysilicon films by repeating the above-described steps, it is possible to form the function element, the data line drive circuit, and the scanning line drive circuit by substantially the same steps as those performed when the switching elements 12 are formed, so that this is advantageous from the viewpoint of production.

Next, the first interlayer insulating layer 21, which is formed of, for example, a silicon oxide film by the atmospheric-pressure CVD method, the low-pressure CVD method, or the like, is formed so as to cover the scanning lines 13a and the capacitance lines 13b at the switching elements 12.

After performing an annealing operation for activating the heavily doped source areas and the heavily doped drain areas, the contact holes to connect the data lines 14 to the semiconductor layers 12a are formed by etching.

The contact holes to connect the scanning lines 13a and the capacitance lines 13b to the wiring layers (not shown) are also formed in the first interlayer insulating layer 21. The contact hole required for, for example, wiring to the function element 18 is similarly formed.

Next, a metallic film, formed of for example, metal silicide or a low-resistance metal, such as light-shielding Al, is deposited onto the first interlayer insulating layer 21 by sputtering or the like. By photolithography, etching, or the like, the metallic film is subjected to patterning in order to form the data lines 14. After this, the second interlayer insulating layer 22, which is, for example, a silicon oxide film formed by the PECVD method, is formed so as to cover the data lines 14.

The contact holes 12c to electrically connect the pixel electrodes 11 and the heavily doped drain areas in the switching elements 12 are formed by etching. A transparent electrically conductive thin film, such as an ITO film, is deposited onto the second interlayer insulating layer 22 by sputtering or the like, and the deposited transparent electrically conductive thin film such as an ITO film is subjected to patterning in order to form the pixel electrodes 11.

For the opposing substrate 30, a glass substrate or the like is first provided. After sputtering, for example, metallic chromium, photolithography or etching is performed to form the light-shielding layer 33.

Thereafter, by depositing a transparent electrically conductive thin film, such as an ITO film, onto the entire surface of the opposing substrate 32 by sputtering or the like, the opposing electrode 32 is formed. The above-described method is only one example, so that it goes without saying that other processes may be used, such as the related process of producing low-temperature polysilicon TFT or high-temperature polysilicon TFT, process of producing bulk silicon, and process of producing SOI.

Lastly, the opposing substrate 32 and the element substrate 20 having each layer formed as described above are disposed so as to cross in a predetermined rubbing direction, and are bonded together so that bonded structure has a predetermined cell thickness in order to form an empty panel. The inside of the panel is filled with liquid crystals in order to produce the liquid crystal display device of the embodiment.

Accordingly, in the embodiment, since, as shown in FIGS. 4(A) and 4(B), the semiconductor layers 12a forming the switching elements 12 and the semiconductor layer 19a of the function element 18 are formed in the same layer, they can be formed by the same process steps. Therefore, it is not necessary to produce the function element and the liquid crystal display device separately as they are in the related art technology, so that it is possible to reduce costs in producing a liquid crystal display device of the type having a function element built in.

As can be understood from the foregoing description, according to the embodiment, it is possible to incorporate a function element, having a function which differ from those of the switching elements, inside the image display area which is used for display and which includes a plurality of pixels making up the liquid crystal display device, without externally mounting the function element as it is in the related art technology. Therefore, it is possible to incorporate various functions, to increase functionality, and to achieve higher integration.

In addition, it is not necessary to perform the process of producing the liquid crystal display device and the process of producing various function elements separately as they are performed in the related technology. The process of producing the function element is included in the process of producing the liquid crystal display device. In particular, various function elements can be produced by the same steps performed in the substrate process, so that the production process can be simplified and reduced in cost.

In FIG. 2, an example of a structure in which the function element 18 is disposed in one of the four areas P contributing to a displaying operation is shown. When a liquid crystal display device performing a color displaying operation is to be realized, it is desirable to use the structure shown in FIG. 12 instead of this structure.

Figure 12:
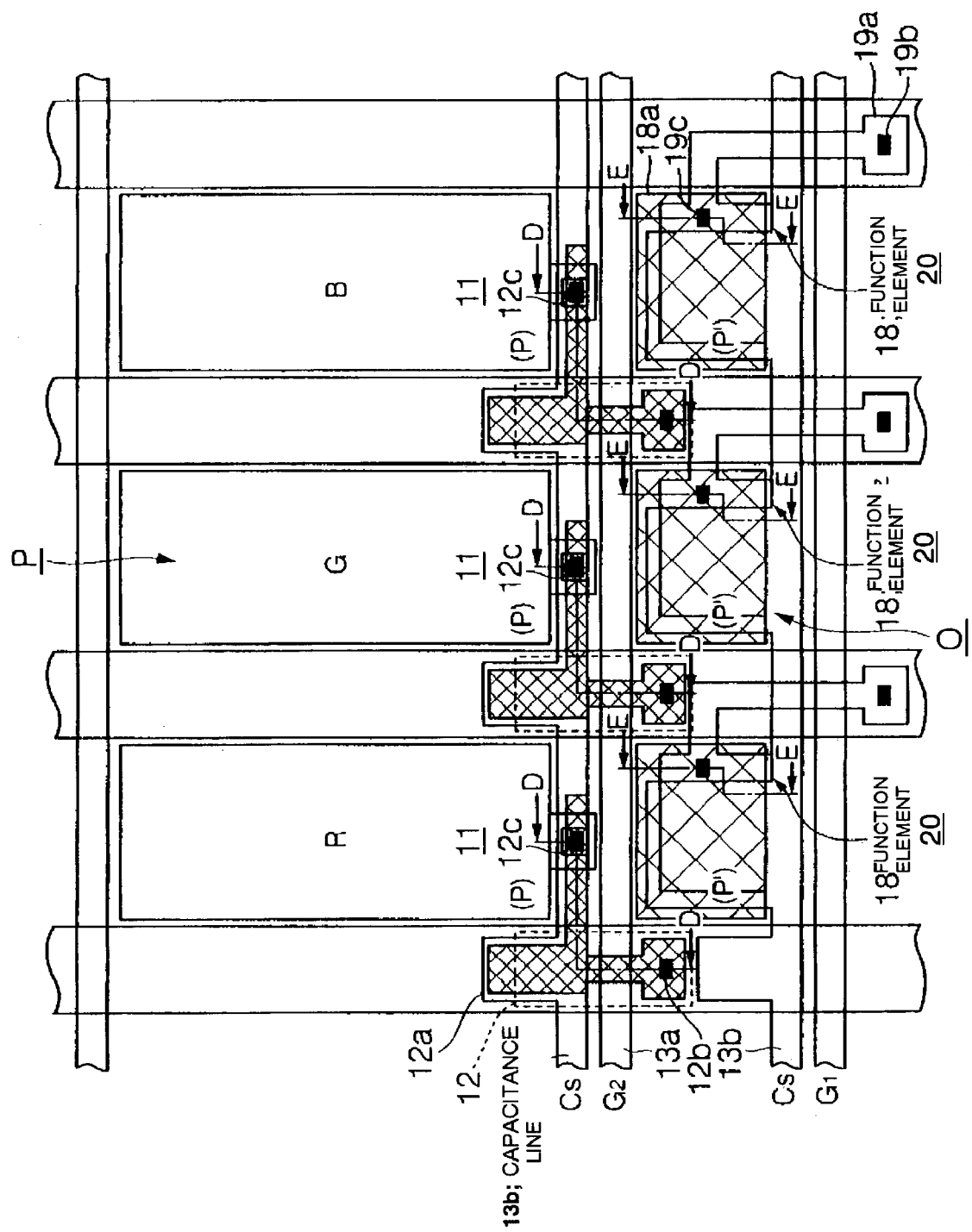
FIG. 12 is a schematic that shows a modification of an arrangement of function elements of the liquid crystal display device of a practical form of the present invention.

More specifically, the areas P contributing to a displaying operation are formed with longitudinal rectangular shapes, and different R, G, and B pixel layers of color filters are allotted to three adjacent dots. These three dots form one pixel capable of being used in a color displaying operation. Below each dot in FIG. 12, areas O whose areas are smaller than the areas of the areas P contributing to a displaying operation and which do not contribute to a displaying operation are provided, and function elements 18 are provided in the respective areas O. In this case, a plurality of function elements having different functions may be disposed.

In this way, when the function elements 18, such as image sensors, are two-dimensionally disposed within the image display area B, it is desirable to change the area ratio between the areas P, contributing to a displaying operation, and the areas O, not contributing to a displaying operation, for designing them. This is because, when this is done, a reduction in the aperture ratio is restricted, so that a reduction in the quality of display caused by the provision of the function elements 18 can be prevented.

Figure 13:
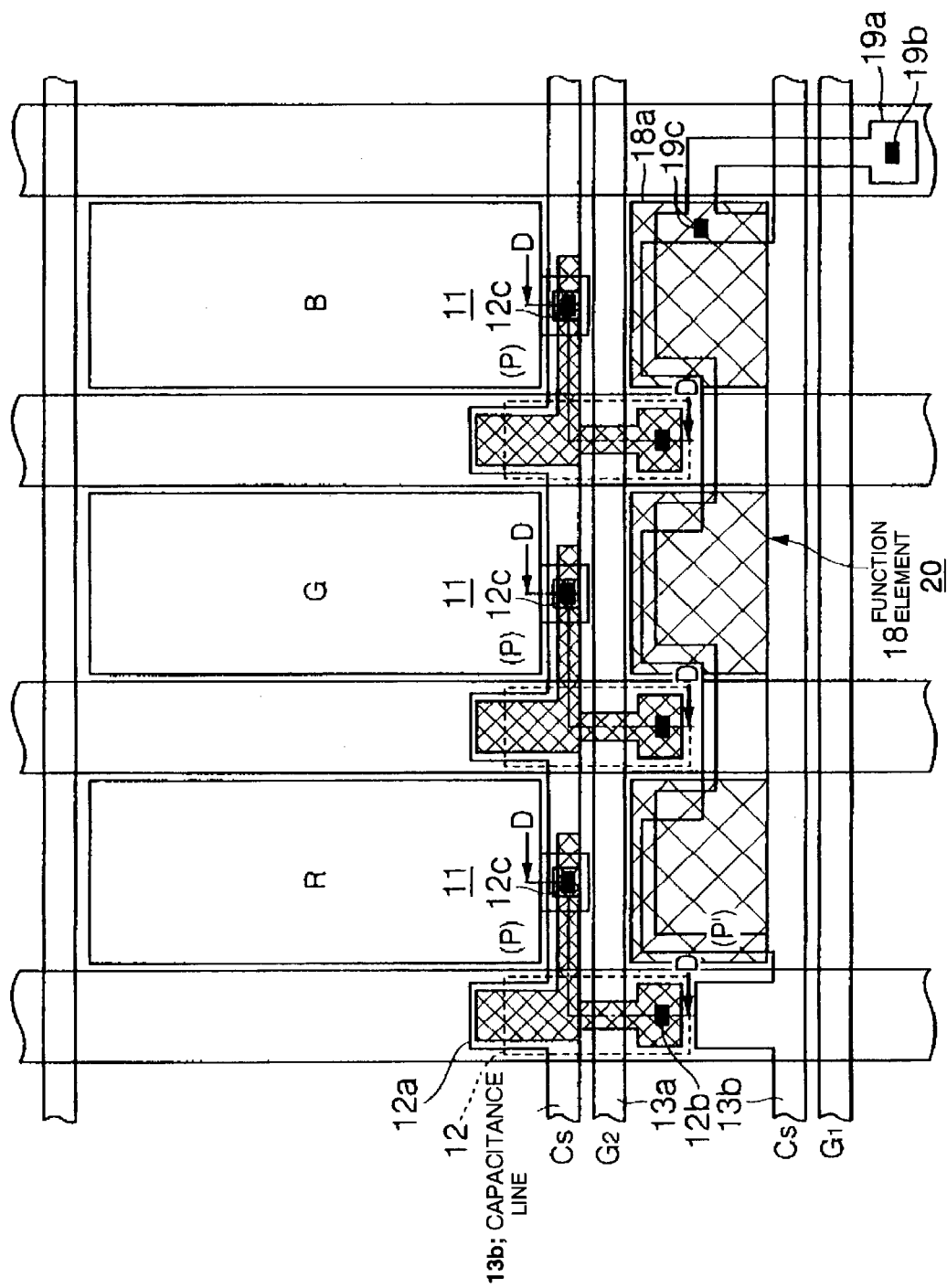
FIG. 13 is a schematic that shows another modification of an arrangement of a function element.

Alternatively, instead of providing one function element 18 in correspondence with one dot as shown in FIG. 12, one function element 18 may be provided for the three dots, R, B, and B dots, as shown in FIG. 13.

Second Embodiment

Figure 5:
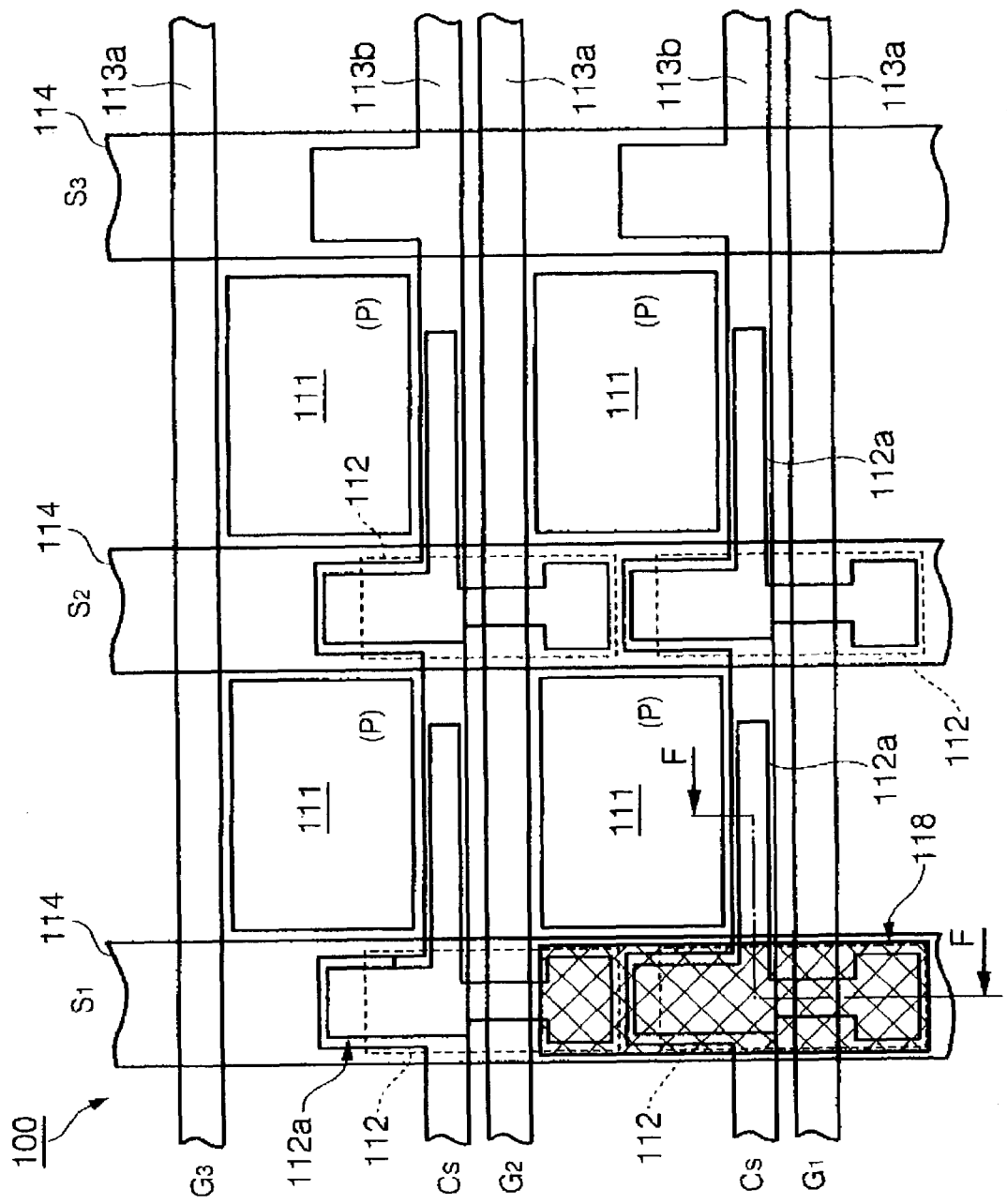
FIG. 5 is a plan view of an example of a structure of a liquid crystal display device of a second embodiment of the present invention.
Figure 6:
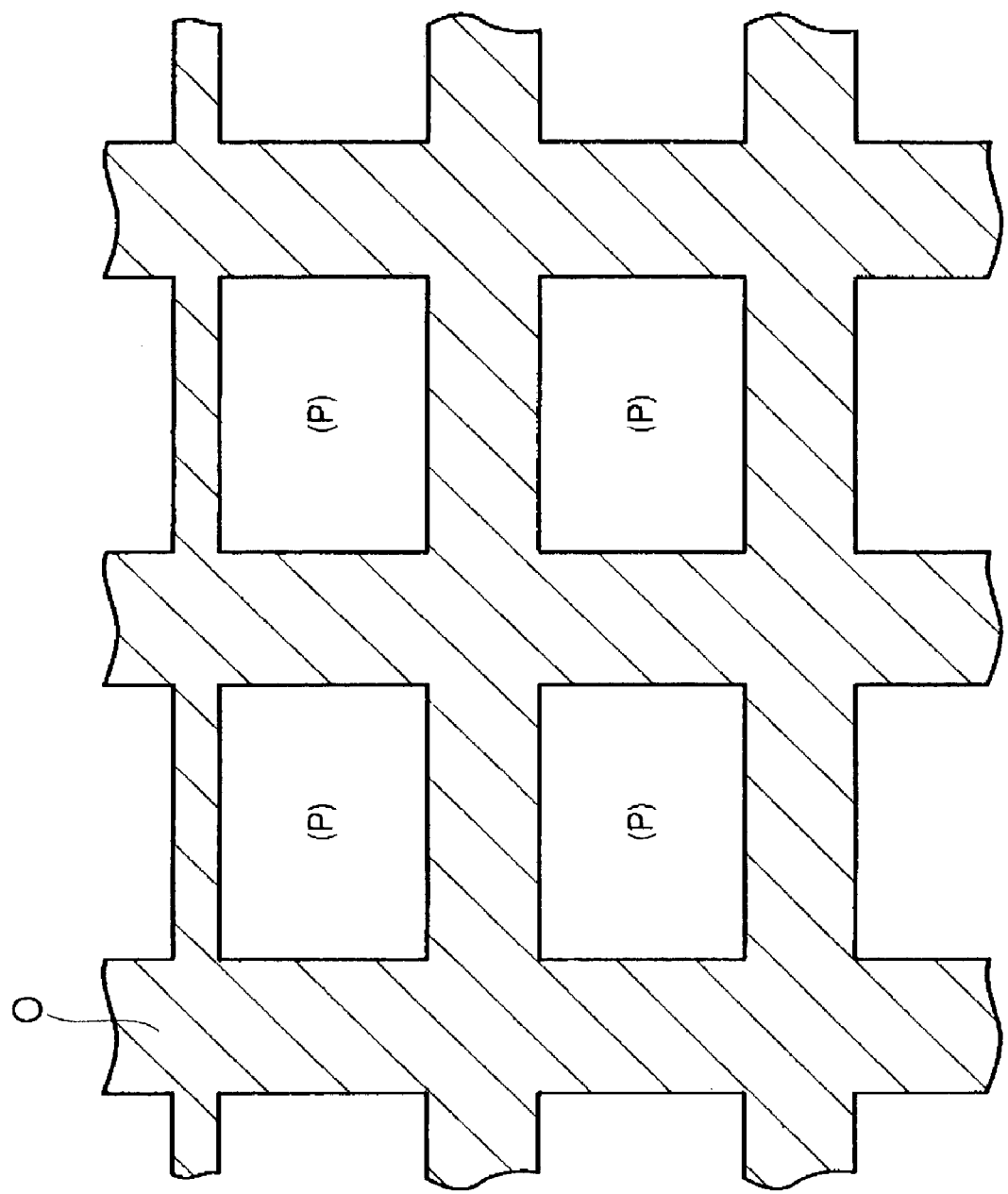
FIG. 6 is a cross-sectional view illustrating areas contributing to a displaying operation and a non-display area not contributing to a displaying operation in a planar structure of the liquid crystal display device shown in FIG. 5.
Figure 7:
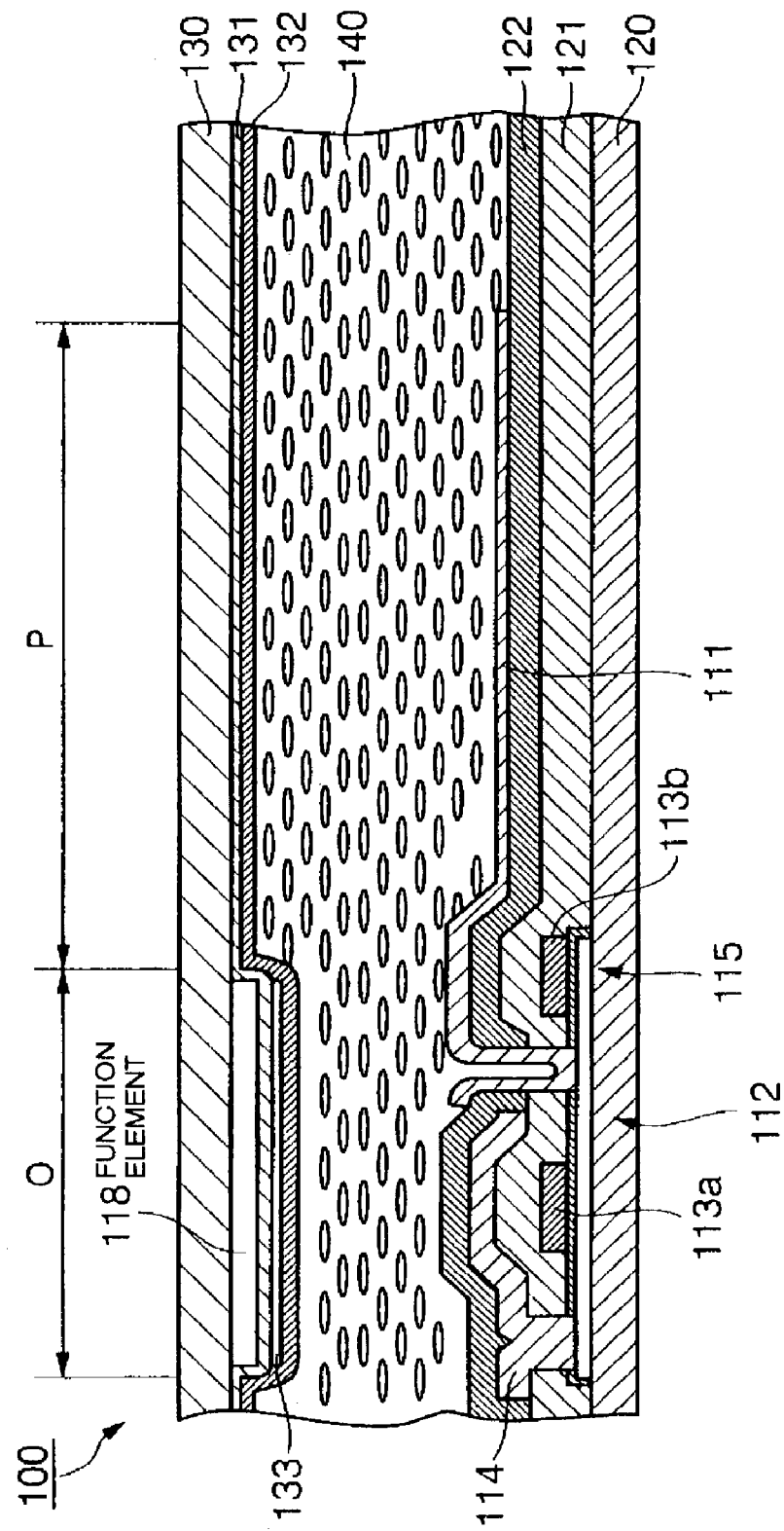
FIG. 7 is a sectional view taken along arrows F of the liquid crystal display device shown in FIG. 5.

Next, a description of a second embodiment of the present invention is provided based on FIGS. 5 to 7. A description of structural features which are essentially the same as those of the first embodiment is simplified, so that only different structural features are mainly described. FIG. 5 is a plan view of the liquid crystal display device of the embodiment.

Although, in the first embodiment, a function element is disposed in an area where a pixel electrode should be formed, in this embodiment, a function element is disposed so as to substantially overlap an area where a wiring layer or a switching element is to be disposed in plan view.

More specifically, as shown in FIG. 5, in the planar structure of a liquid crystal display device 100, wiring layers, such as scanning lines 113a, capacitance lines 113b, and data lines 114, are formed in a matrix form. By disposing pixel electrodes 111 at respective intersections of these scanning lines 113a and data lines 114, the pixel electrodes 111 are formed in a matrix form.

Semiconductor layers 112a for forming transistors of switching elements 112 to select the pixel electrodes 111 are formed so that the data lines 114 and the scanning lines 113a overlap in plan view, and a function element 118 is disposed at a location where it substantially overlaps the wiring layers, such as the data line 114 and the scanning line 113a, and switching element 112 in plan view.

By using the semiconductor layers 112a, the switching elements 112 are electrically connected to the respective data lines 114 and to the respective pixel electrodes 111.

In the liquid crystal display device 100 having the above-described structure, as shown in FIGS. 5 and 6, areas P contributing to a displaying operation by the pixel electrodes 111 and a non-display area O not contributing to a displaying operation by the scanning lines 113a, data lines 114, and capacitance lines 113b are formed, and the function element is disposed in the area O shown in FIG. 6 not contributing to a displaying operation. Since the area O not contributing to a displaying operation is essentially an area which does not transmit light, display quality is not reduced even if the function element is disposed.

In the sectional structure of the liquid crystal display device 100, as shown in FIG. 7, an element substrate 120 having formed thereon the pixel electrodes 111, the switching elements 112, the scanning lines 113a, the data lines 114, etc., an opposing substrate 130 having formed thereon the function element 118, an insulating layer 131, a light-shielding layer 133, and an opposing electrode 132, and a liquid crystal layer 140 filling the gap between the element substrate 120 and the opposing substrate 130 are included and formed.

In other words, in the planar structure shown in FIG. 5, the function element 118 is disposed at a location where it overlaps the wiring layers, such as the data line 114 and the scanning line 113a, or the switching element 112 in plan view, whereas, in the sectional structure shown in FIG. 7, the function element 118 is formed on the surface of the opposing substrate 130 at the side of the liquid crystal layer 140 in an area in correspondence with the switching element 112.

The insulating layer 131 is formed so as to cover the function element 118 and the opposing substrate 130, and the light-shielding layer 133 is formed below the insulating layer 131 in correspondence with the areas where the switching elements 112 are disposed. The opposing electrode 132 is formed so as to cover the light-shielding layer 133 and the insulating layer 131. The light-shielding layer 133 may be provided, for example, at the side of the opposing substrate 130, at the side of the opposing substrate 130 and the element substrate 120, or at the side of the element substrate 120. Here, light may be incident upon either the element substrate 120 or the opposing substrate 130. However, when light traveling from the opposing substrate 130 is to be shielded by the light-shielding layer 133, it is desirable to dispose the light-shielding layer 133 at the side of the opposing substrate 130. Although the wiring layers for the function element 118 are not shown, it is desirable to provide them at the side of the opposing substrate 130. The function element 118 maybe formed at a location between the light-shielding layer 133 and the liquid crystal layer 140.

Here, although, as shown in FIG. 7, the areas P having the pixel electrodes 111 formed thereat and contributing to a displaying operation are subjected to constraints due to by, for example, the size of the switching elements 112 and wiring widths of the data lines 114, scanning lines 113a, and capacitance lines 113b, etc., on the element substrate 120, the areas P are open areas which can pass light. In other words, the areas between the pixel electrodes 111, or the areas other than the areas where the pixel electrodes 111 are formed, become the area O, that is, a non-display area, not contributing to display.

The function element 118 used in the embodiment is disposed in any portion of the area O not contributing to a displaying operation. The function element is formed so that the whole or part of it overlaps at least one of the scanning line, capacitance line, data line, and switching element.

In the first embodiment, since the function element is disposed in any space within the image display area, there may be problems such as a reduction in aperture ratio, so that it is likely that an image will accordingly appear dark due to the reduced aperture ratio.

In contrast to this, in the second embodiment, since the function element is disposed at a location where it overlaps the wiring layers or the switching element in plan view in an area not contributing to a displaying operation, a reduction in display quality caused by a reduction in aperture ratio does not occur. Therefore, this embodiment is advantageous for the case where a display is viewed in circumstances where a transmission window is small, such as a liquid crystal display device used as a display of hand-held terminals, such as PDAs or cellular phones.

Since the function element is provided in an area where it overlaps the light-shielding layer at the opposing substrate side, it can be formed in an area not transmitting light. In addition, since the function element is provided at the side of the opposing substrate, element density is lower and yield is higher compared to the case where the function element is disposed at the side of the element substrate.

Further, when the function element 18 is formed at, for example, a temperature correction circuit, providing a number of such temperature correction circuits within the image display area B makes it possible to correct the actual temperature within the image display area B.

As described above, according to the embodiment, since the function element can be installed inside the liquid crystal display device so that it overlaps the switching element or the wiring layers of the liquid crystal display device, without being externally disposed as it is in the related art technology, higher integration can be achieved. Here, since the function element is formed at a location where it overlaps the wiring layers or the switching element, it does not interfere with the areas (open areas) contributing to a display operation by the pixel electrodes, so that display quality is not reduced.

Third Embodiment

Figure 8A:
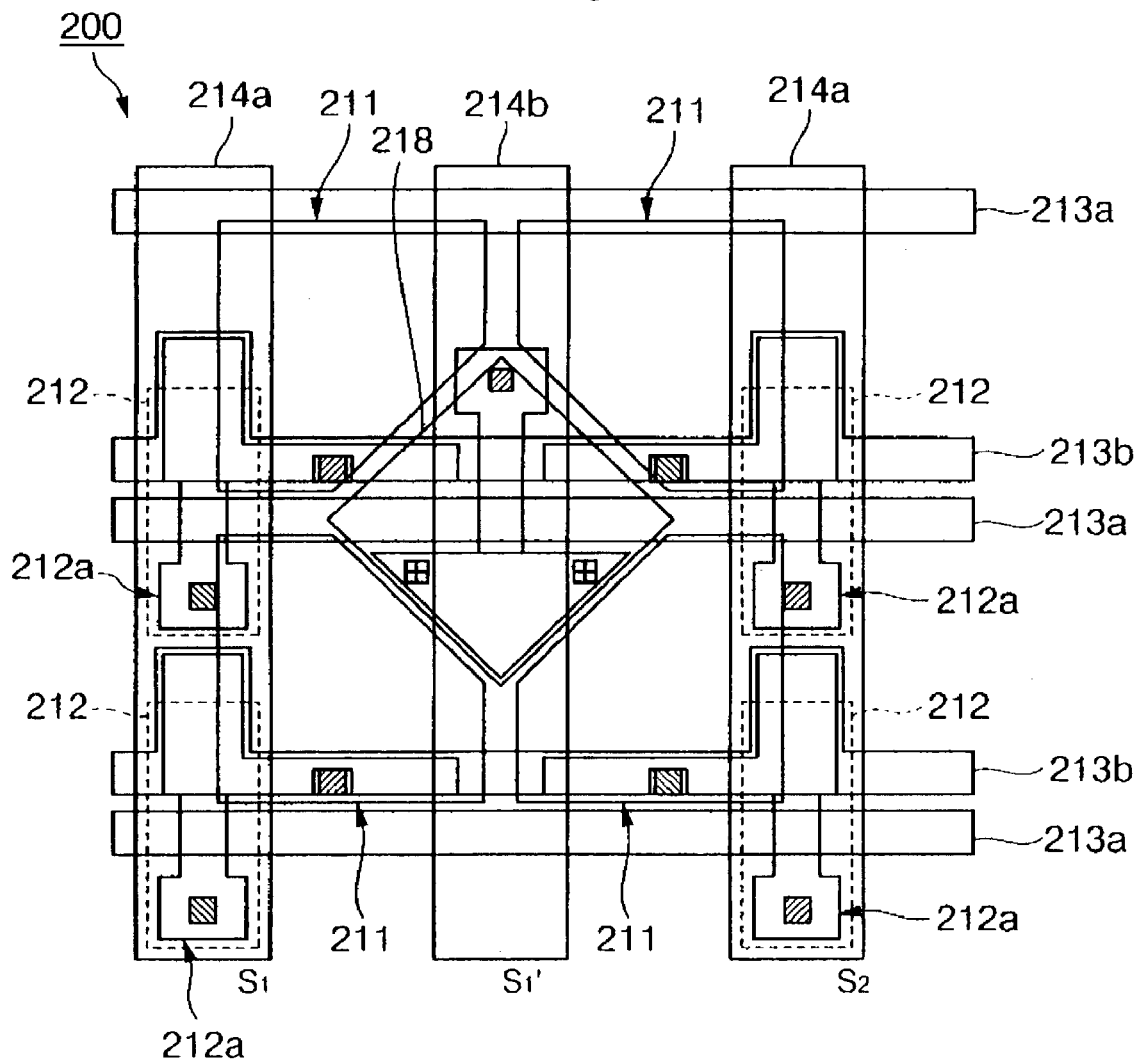
FIGS. 8(A) and 8(B) are plan views showing an example of a structure of a liquid crystal display device of a third embodiment of the present invention.
Figure 8B:
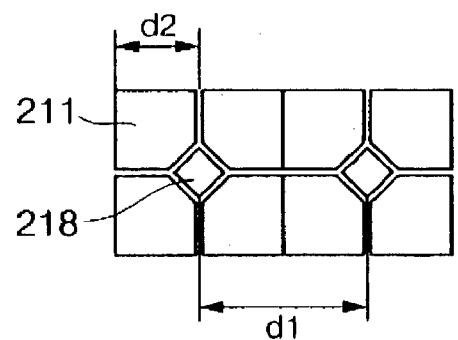

Next, a description of a third embodiment of the present invention is provided based on FIGS. 8(A) and 8(B). FIGS. 8(A) and 8(B) are plan views of the third embodiment of the present invention.

In the embodiment, an example of a structure where the number of function elements formed in the image display area is less than the number of pixel electrodes is disclosed.

More specifically, in the planar structure of a liquid crystal display device 200 of the embodiment, as shown in FIG. 8(A), wiring layers, such as scanning lines 213a, capacitance lines 213b, pixel electrode data lines 214a, and function-element data lines 214 are formed in a matrix form. By disposing pixel electrodes 211 at respective intersections of these scanning lines 213a and data lines 214a and 214b, the pixel electrodes 211 are formed in a matrix form.

Semiconductor layers 212a to form transistors of switching elements 212 to select the pixel electrodes 211 are formed so that the data lines 214a and 214b, the scanning lines 213a, and the capacitance lines 213b overlap in plan view.

Each function element 218 is disposed among four adjacent pixel electrodes 211 in an area where the data line 214b, the scanning line 213a, and the capacitance line 213b intersect.

In the embodiment, in order to dispose the function elements 218 in the same layer (same plane) as the pixel electrodes 211 on the element substrate, portions of the pixel electrodes 211 corresponding to the locations of the function elements 218 are cut away in accordance with the shapes of the function elements 218. In addition, in the embodiment, the function elements 218 are disposed in non-display areas not contributing to a displaying operation where the function element data lines 214b and the scanning lines 213a cross.

By such a structure, as shown in FIG. 8(B), a distance d1 between adjacent function elements 218 is made larger than a distance d2 between adjacent pixel electrodes 211, so that a difference in density, that is, the density of the function elements 218 in the image display area is reduced.

In this way, by disposing fewer function elements 218, the areas occupied by the function elements 218 in a plane are reduced, so that interference with the areas where the pixel electrodes 211 are formed and which contribute to a displaying operation is reduced, the areas which pass light and contribute to a displaying operation can be widened, so that a reduction in the aperture ratio is minimized or reduced, thereby making it possible to prevent or substantially prevent a reduction in display quality.

Since the function elements and the pixel electrodes are formed in substantially the same layer, they can be produced by the same production process, thereby making it possible to increase production throughput and to reduce production costs. In addition, since fewer function elements are used, yield is increased.

Although, in the embodiment, the case where one function element is disposed with respect to four pixel electrodes is described, it does not matter how many function elements are disposed with respect to the number of pixel electrodes. For example, one function element may be formed with respect to nine pixel electrodes. The embodiment is preferred when a plurality of function elements having different functions are disposed. In other words, when a plurality of function elements having different functions are displaced from each other and disposed in the same way, a multifunctional and high-performance liquid crystal display device can be provided.

Although the case where the number of function elements is less than the number of pixel electrodes is described, the number of pixel electrodes may be less than the number of function elements. The point is that the distance between the image pixels and the distance between the function elements are different.

In a modification, when areas where portions of the wiring layers and portions of the pixel electrodes overlap are formed, the aperture ratio can be further increased by forming the capacitance lines above the scanning lines.

Although the liquid crystal display device and the method of producing the liquid crystal display device are described in accordance with particular embodiments, various modifications can be made by those skilled in the art with respect to the above-described embodiments of the invention without departing from the gist and scope of the present invention.

Figure 9:
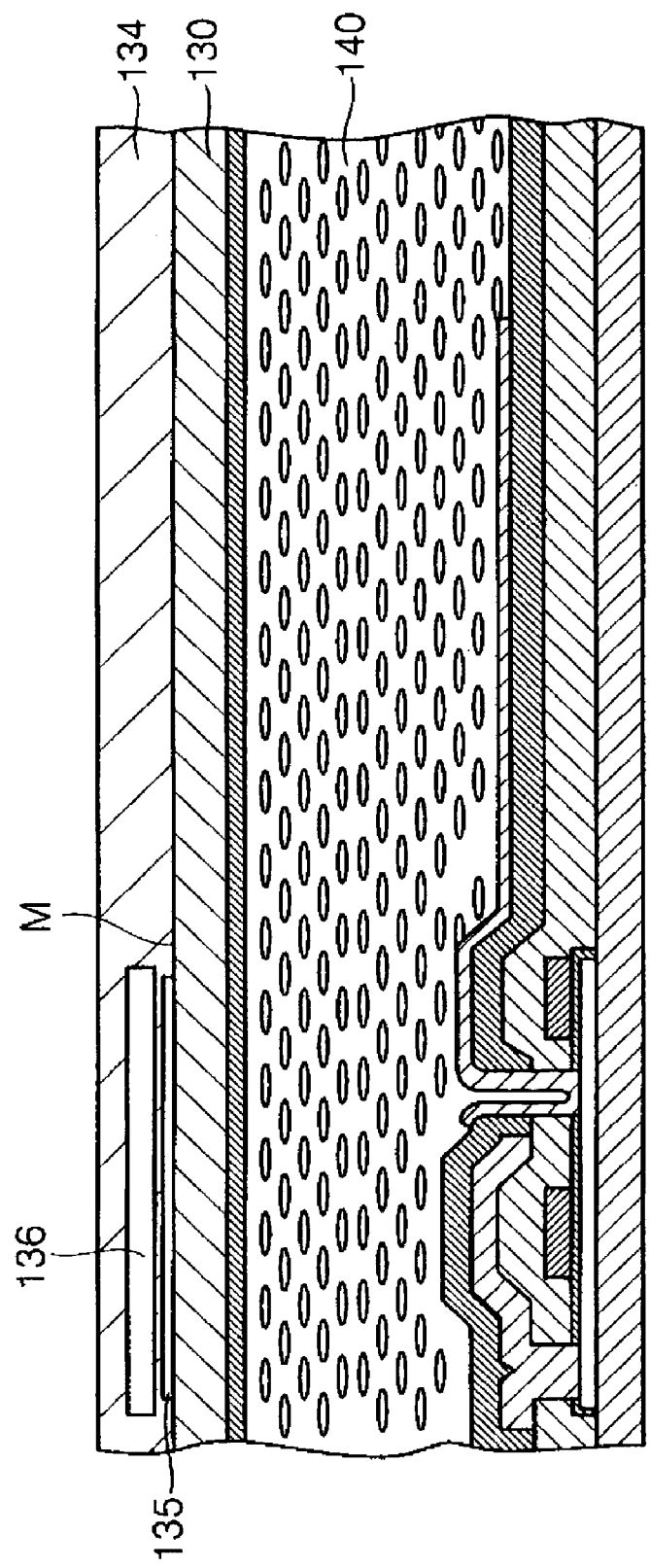
FIG. 9 is a sectional view of an example of a structure of the liquid crystal display device of a practical form of the present invention.

For example, although, in the second embodiment, the case where each function element is interposed between the light-shielding layer and the opposing substrate is described, the present invention is not limited thereto. As shown in FIG. 9, a structure in which a protective layer 134 is formed on a surface M of the opposing substrate 130 disposed opposite to the side of the surface of the opposing substrate 130 facing the liquid crystal layer 140, and in which a function element 136 is disposed in the protective layer 134 at a location where it overlaps the light-shielding layer 133 and a light-shielding layer 135 may be used. The protective layer 134 is formed of, for example, a nitride film or an oxide film.

Alternatively, a function element and function-element wiring layers may be formed so as to be stacked on top of the switching element and the wiring layers on the element substrate.

Figure 10:
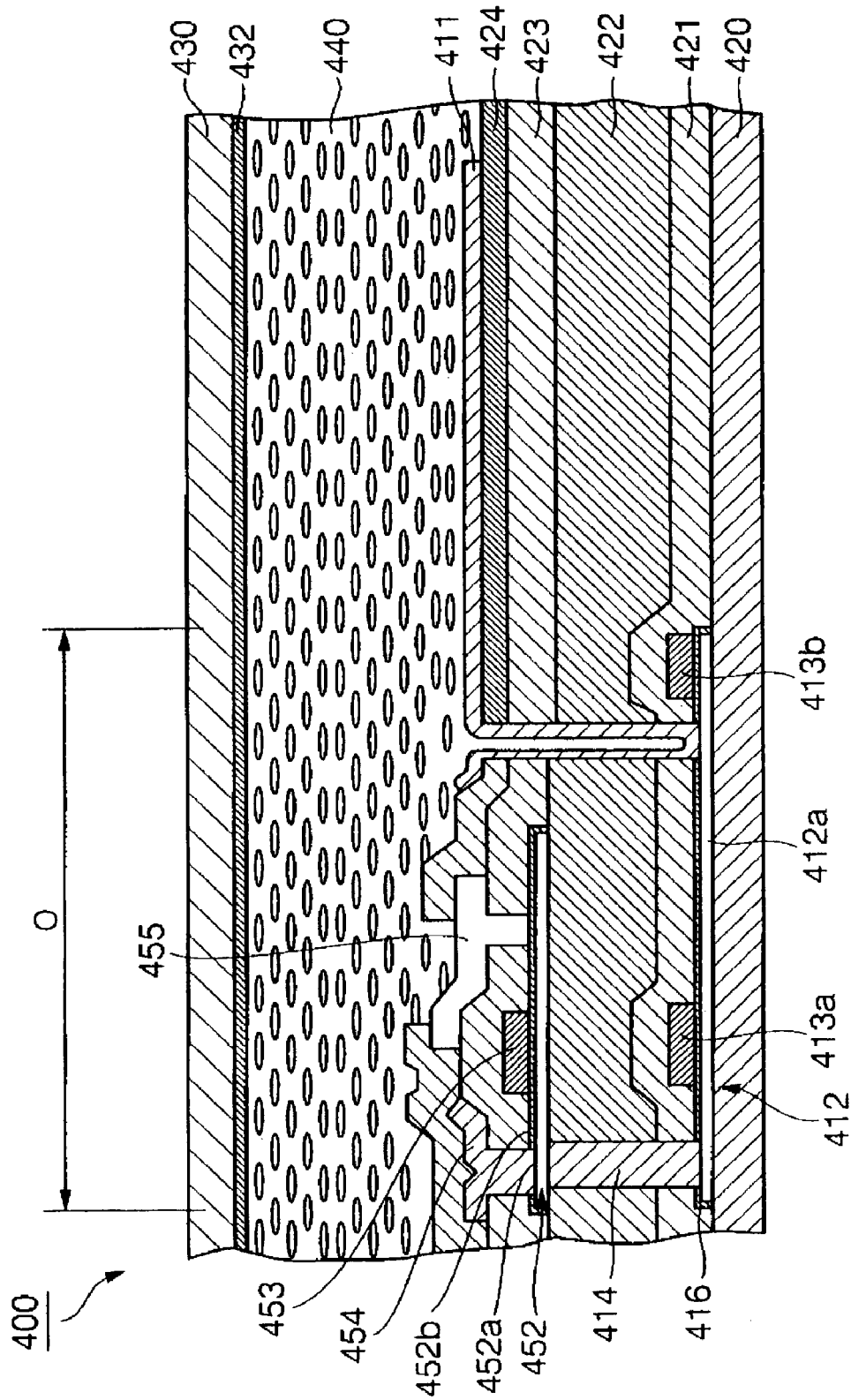
FIG. 10 is a sectional view of an example of the liquid crystal display device of another practical form of the present invention.

More specifically, as shown in FIG. 10, in the sectional structure of a liquid crystal display device 400, an element substrate 420 having formed thereon switching elements 412, scanning lines 413a, data lines 414, pixel electrodes 411, etc., an opposing substrate 430 having an opposing electrode 432 formed thereon, and a liquid crystal layer 440 filling the gap between the element substrate 420 and the opposing substrate 430 are included and formed.

Semiconductor layers 412a, an insulating film 416, scanning lines 413a and capacitance lines 413b, a first interlayer insulating layer 421, a second interlayer insulating layer 422, data lines 414, and a function element 452 are formed on the element substrate 420. The semiconductor layers 412a are disposed directly on the element substrate 420 and are used to form transistors of the switching elements 412 for selecting the pixel electrodes 411. The insulating film 416 includes a gate insulating film to insulate the scanning lines 413a and the semiconductor layers 412a. The scanning lines 413a and the capacitance lines 413b are separated from each other on the insulating film 416. The first interlayer insulating layer 421 is formed so as to cover the scanning lines 413a, the capacitance lines 413b, the insulating film 416, and the element substrate 420. The second interlayer insulating layer 422 is formed over the area covering the first interlayer insulating layer 421. The data lines 414 are disposed so as to pass through the first interlayer insulating layer 421 and the second interlayer insulating layer 422 in the area where the semiconductor layers 412a are formed. The function element 452 is formed on the second interlayer insulating layer 422 so as to contact the data line 414 in an area O where the semiconductor layers 412a are formed.

In the function element 452, a semiconductor layer 452a to form a transistor forming a function-element switching element formed on the second interlayer insulating layer 422 and the data line 414, an insulating film 452b including a gate insulating film to insulate the semiconductor layer 452a and a function-element scanning line 453, and an electrode 455 which is electrically connected to the function-element semiconductor layer 452a are formed.

The function-element scanning line 453, a third interlayer insulating layer 423, a function-element data line 454, a fourth interlayer insulating layer 424, and a pixel electrode 411 are formed on the element substrate 420. The function-element scanning line 453 is formed on the insulating film 452b. The third interlayer insulating film 423 is formed so as to cover the scanning line 453, the insulating film 452b, and the second interlayer insulating film 422. The function-element data line 454 is disposed in an area where the semiconductor layer 452a is formed above the third interlayer insulating layer 423. The fourth interlayer insulating layer 424 is formed over the area covering the data line 454 and the third interlayer insulating layer 423 so as to open in the area where the electrode 455 is formed. The pixel electrode 411 is formed on the fourth interlayer insulating film 424 so as to extend around the area O where the semiconductor layers 412a is formed.

A contact hole passing through the second interlayer insulating layer 422, the first interlayer insulating layer 421, and the insulating film 416 is formed, so that the data lines 414 and the semiconductor layers 412a as well as the data line 414 and the semiconductor layer 452a can be electrically connected. In addition, a contact hole passing through the fourth interlayer insulating layer 424, the third interlayer insulating layer 423, the second interlayer insulating layer 422, the first interlayer insulating layer 421, and the insulating film 412b is formed, so that the pixel electrodes 411 and the semiconductor layers 412a can be electrically connected.

Further, a contact hole passing through the third interlayer insulating layer 423 and the insulating film 452b is formed, so that the function-element data line 454 and the function-element semiconductor layer 452a can be electrically connected. Still further, a contact hole passing through the third interlayer insulating layer 423 and the insulating film 452b is formed, so that the electrode 455 and the semiconductor layer 452a can be electrically connected. In other words, the function-element data line 454 and the pixel-electrode data lines 414 to select pixel electrodes are electrically connected, so that an input/output terminal is used in common. Here, by forming the data lines 414 and the semiconductor layer 452a so that they are not electrically connected, input/output operations of the function element and the switching elements to select the pixel electrodes can be separately performed.

Like the pixel electrodes 411 formed on the element substrate 420, the opposing electrode (common electrode) 432 is formed of a transparent electrically conductive thin film, such as an ITO film, and over the entire surface of the opposing substrate 430.

In the liquid crystal display device 400 having such a structure, while providing the same operations and advantages as those of each of the above-described embodiments, a structure in which the data lines 414 and the scanning lines 413a at the switching elements 412 as well as the data line 454 and the scanning line 453 at the function element 452 are separately overlapped and disposed may be used.

Although, in each of the embodiments, the case where one type of function element is provided is mainly described, a plurality of different types of function elements may be used.

Although, in each of the embodiments, active matrix liquid crystals are used, the liquid crystals do not need to be active matrix liquid crystals. More specifically, there may be used a structure in which, when, as in a passive matrix type having a column line on one substrate and a row line on the other substrate, a pixel electrode crosses the upper and lower substrates in the form of a stripe, the column line and the row line are selected and have respective voltages applied thereto in order to move the liquid crystals during the voltage application and to set this as the selection period. In this case, there may be used a structure in which a function element having a sensor electrode (function-element electrode) electrically connected to a plurality of data lines and scanning lines that cross each other is disposed within the image display area B. This is a structure formed by combining a passive matrix liquid display device and an active matrix function element.

Figure 14:
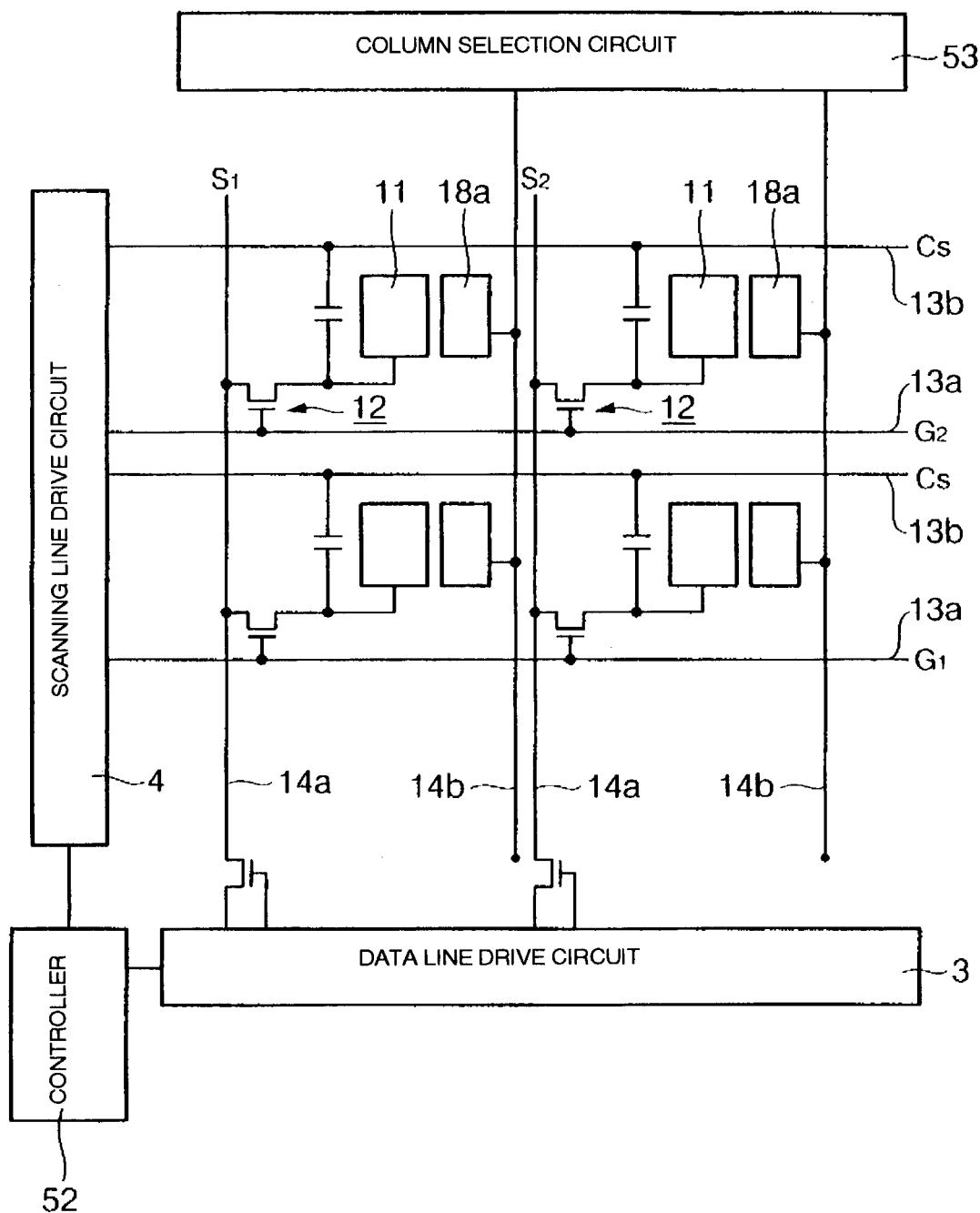
FIG. 14 is a schematic of an equivalent circuit of a liquid crystal display device of a practical form of the present invention.
Figure 15:
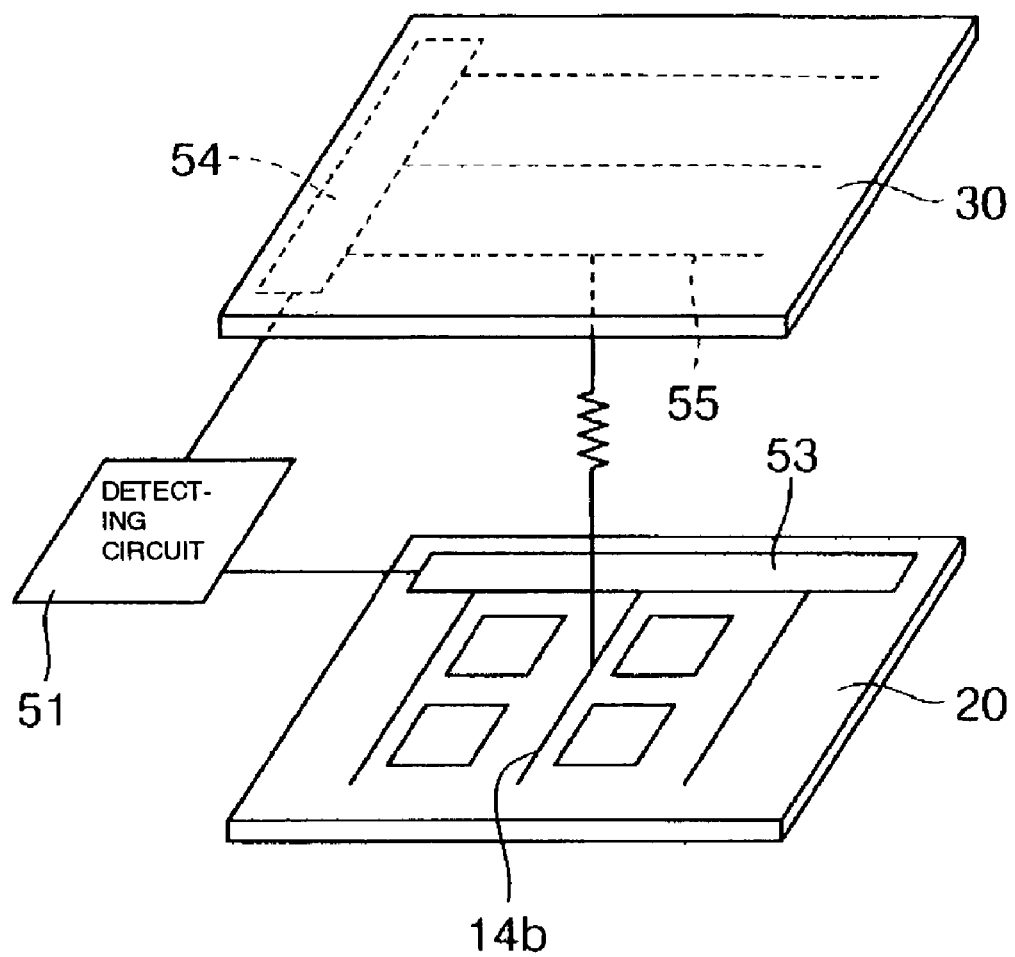
FIG. 15 is a schematic perspective view of the liquid crystal display device.

On the other hand, as shown in FIGS. 14 and 15, a liquid crystal driving side includes a plurality of data lines 14a and scanning lines 13a that cross each other and liquid crystal driving pixel electrodes 11 that are provided at areas surrounded by the data lines 14a and the scanning lines 13a. Function elements 18 each include a pair of electrodes, a sensor electrode 18a at the side of an element substrate 20 and an electrode (not shown) at the side of an opposing substrate 30. A structure may be used in which the element substrate 20 side selects the sensor electrode 18a by a column selection circuit 53 shown in FIG. 14, and the opposing substrate side 30 selects the opposing-substrate-side electrode by a row line 55 connected to a row selection circuit 54 extending in a direction orthogonal to the column side shown in FIG. 15. In this structure, a detecting circuit 51 reads out data at pixels corresponding to the electrodes selected at both the element substrate 20 side and the opposing substrate 30 side.

By virtue of this structure, it is possible to achieve a structure which is a combination of an active matrix liquid crystal display device and a passive matrix function element. In either combination, if either one of the liquid crystal display device and the function element is a passive matrix type, the structure is simplified, thereby making it possible to reduce costs.

Figure 16:
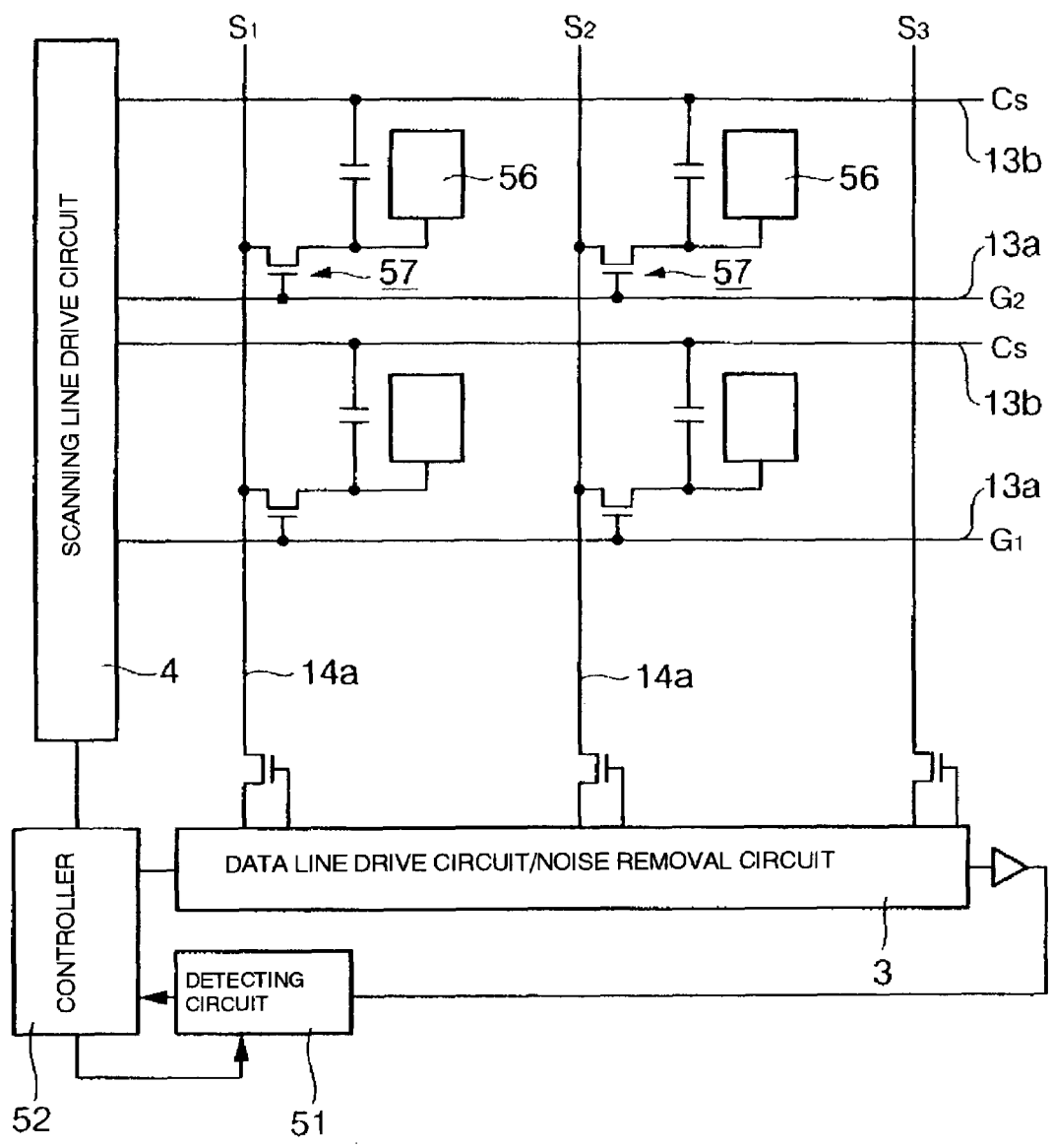
FIG. 16 is a schematic of an equivalent circuit of a liquid crystal display device of still another practical form of the present invention.

Alternatively, as shown in FIG. 16, a structure may be used in which function elements are disposed within areas P contributing to a displaying operation, electrodes 56 are used as liquid crystal driving electrodes and function-element electrodes, and switching elements 57 serving as switching elements to apply voltage to the liquid crystal driving electrodes and as switching elements to write data to and read out data from the function elements. In this case, it is necessary to provide with respect to a data line drive circuit 3 a detecting circuit 51 and a controller 52 to control the detecting circuit 51.

In terms of the quality of and defects in the liquid crystal display device during the production process or shipment, instead of forming a scanning line drive circuit on the element substrate of the liquid crystal display device shown in FIG. 1, it may be electrically and mechanically connected to a driving LSI, mounted on the substrate by TAB (tape automated bonding) or the like, through an anisotropic electrically conductive film provided near the element substrate.

Polarization filters, retardation films, polarizing means, or the like, may be disposed in a predetermined direction at the side of the opposing substrate upon which projection light is incident and the side of the element substrate from which light exits in accordance with, for example, the operation mode, such as a TN (twisted nematic) mode, or whether or not the mode is a normally white mode or a normally black mode.

The type of liquid crystal display device is not limited to a transmissive type, so that the liquid crystal display device may be a reflective type or a hybrid type which is a combination of the reflective type and the transmissive type. It is desirable that the liquid crystal display device of any of the embodiments be applied to an electronic apparatus, such as a hand-held terminal. In this case, it is possible to realize an electronic apparatus having excellent display quality and having various functions, such as a touch-key function.

One micro-lens may be formed for one pixel on the opposing substrate. This increases the collection efficiency of incident light, so that a bright liquid crystal display device can be realized. By depositing layers of interference layers having difference refractive indices upon the opposing substrate, a dichroic filter which produces red, green, and blue making use of light interference may be used. The opposing substrate with a dichroic filter makes it possible to realize a brighter color liquid crystal display device.

Each of the embodiments is effective even if the switch elements that are provided for the respective pixels are, for example, positive-stagger-type TFTS, coplanar polysilicon TFTs, reverse-stagger-type TFTs, amorphous silicon TFTs, SOI-MOSFETs, bulk silicon MOSFETs, or bipolar transistors, for example.

Various steps are included in the above-described embodiments, so that various inventions may be achieved by combining the disclosed structural requirements as necessary. More specifically, it goes without saying that the present invention includes cases where embodiments described above are combined or cases where any one of the embodiments is combined with any of the modifications. There may be used structures in which some of the structural requirements of the embodiments are eliminated. For example, although, in the above description, the electro-optical device is described as a liquid crystal display device, the present invention is not limited thereto, so that it goes without saying that the present invention is applicable to electro-optical devices using various electro-optical elements making use of, for example, fluorescence achieved by electron discharge and plasma emission, electro-luminescence (EL) devices or digital micro-mirror devices (DMDs), and electronic apparatuses using any one of the electro-optical devices, for example.

In the above description, only exemplary embodiments of the present invention are disclosed. Various modifications and/or changes may be made as necessary within a predetermined scope of the present invention, so that the embodiments are described for illustrative purposes only and do not limit the present invention.

[Advantages]

As described above, according to the present invention, it is possible to incorporate various functions, to increase functionality, and to achieve higher integration because the liquid crystal display device can be formed with a structure which incorporates function elements, having functions that differ from those of the drive elements, inside areas which contribute to a displaying operation and which include a plurality of pixels that form the liquid crystal display device, without externally mounting the function elements as they are in the related art technology.

In addition, it is possible to reduce production costs because the process for producing the liquid crystal display device and the process for producing the function element or function elements do not have to be performed separately, that is, because the process for producing the function element or function elements is included in the process for producing the liquid crystal display device.

What is claimed is:

1. A liquid crystal display device having an area used for display, comprising:
   a first substrate;
   a second substrate;
   a liquid crystal layer between the first and second substrates;
   a plurality of pixels disposed in a matrix form;
   a plurality of drive elements formed on the first substrate to drive the pixels;
   a signal wiring layer formed on the first substrate to drive the pixels;

a light-shielding layer formed on the second substrate at a location opposing the drive element; and a function element having a function that is different from a function of the drive elements disposed at a location where the function element overlaps at most two of the plurality of drive elements within the area used for display, the function element being in a non-overlapping condition with others of the drive elements, wherein the function element is disposed on a surface of the second substrate that faces the liquid crystal layer, the function element being formed at a side of the light-shielding layer facing away from the liquid crystals, the function element includes an element selected from a group consisting of an image pick-up element, a memory element, an operating circuit, a temperature correction circuit, a feedback circuit, a photodiode, and a sensor; and an insulating layer separating the light-shielding layer from the second substrate and the function element.

2. The liquid crystal display device according to claim 1, the wiring layer including a plurality of data lines and a plurality of scanning lines that cross each other, liquid crystal driving pixel electrodes being formed in respective areas surrounded by the data lines and the scanning lines, the function element having a pair of electrodes, with the pair of electrodes positioned so as to cross each other in a plane.

* * * * *